(12) United States Patent
Shojaei-Zadeh et al.

(10) Patent No.: US 9,388,289 B2
(45) Date of Patent: Jul. 12, 2016

(54) OPEN-CELL FOAM FOR THE SELECTIVE ABSORPTION OF OIL FROM WATER

(71) Applicant: Rutgers, The State University of New Jersey, New Brunswick, NJ (US)

(72) Inventors: Shahab Shojaei-Zadeh, Piscataway, NJ (US); Michael Fechtmann, Princeton, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 215 days.

(21) Appl. No.: 14/193,625

(22) Filed: Feb. 28, 2014

(65) Prior Publication Data

US 2014/0246374 A1 Sep. 4, 2014

Related U.S. Application Data

(60) Provisional application No. 61/771,249, filed on Mar. 1, 2013.

(51) Int. Cl.

| | |
|---|---|
| *C08J 9/14* | (2006.01) |
| *C02F 1/28* | (2006.01) |
| *C08J 9/00* | (2006.01) |
| C02F 101/32 | (2006.01) |
| C02F 103/00 | (2006.01) |
| C02F 103/08 | (2006.01) |

(52) U.S. Cl.
CPC ............. *C08J 9/142* (2013.01); *C02F 1/285* (2013.01); *C08J 9/0014* (2013.01); *C08J 9/0066* (2013.01); *C08J 9/141* (2013.01); *C08J 9/144* (2013.01); C02F 2101/32 (2013.01); C02F 2103/007 (2013.01); C02F 2103/08 (2013.01); C02F 2303/16 (2013.01); C08J 2203/12 (2013.01); C08J 2203/14 (2013.01); C08J 2203/142 (2013.01); C08J 2205/044 (2013.01); C08J 2363/00 (2013.01); C08J 2383/04 (2013.01)

(58) Field of Classification Search
CPC ............. C02F 1/285; C02F 2101/32; C02F 2103/007; C02F 2103/08; C02F 2303/16; C08J 9/0014; C08J 9/0066; C08J 9/141; C08J 9/142; C08J 9/144; C08J 2203/12; C08J 2203/14; C08J 2203/142; C08J 2205/044; C08J 2363/00; C08J 2383/04
See application file for complete search history.

(56) References Cited

U.S. PATENT DOCUMENTS

2003/0176516 A1\* 9/2003 Underwood ............ A61L 27/16 521/50

OTHER PUBLICATIONS

Alauzun, Johan G. et al., "Novel monolith-type boron nitride hierarchical foams obtained through integrative chemistry", J. Mater. Chem., 21: 14025-14030 (2011).

Annunciado, T.R. et al., "Experimental investigation of various vegetable fibers as sorbent materials for oil spills", Marine Pollution Bulletin, 50: 1340-1346 (2005).

Balk, Lennart et al., "Biomarkets in Natural Fish Populations Indicate Adverse Biological Effects of Offshore Oil Production", PLos One, 65(5): e19735 (2011).

Balseiro, A. et al., "Pathological Features in Marine Birds Affected by the Prestige's Oil Spill in the North of Spain", Journal of Wildlife Diseases, 41(2): 371-378 (2005).

Barg, S. et al., "Novel open cell aluminum foams and their use as reactive support for zeolite crystallization", J. Porous Mater, 18: 89-98 (2011).

Binks, Bernard P. et al., "Phase inversion of particle-stabilized materials from foams to dry water", Nature, 5: 865-869 (2006).

Binks, Bernard P. et al., "Aqueous Foams Stabilized Solely by Silica Nanoparticles", Angew. Chem., 117: 3788-3791 (2005).

Binks, Bernard P., "Particles as surfactants—similarities and differences", Current Opinion in Colloid & Interface Science, 7: 21-41 (2002).

Brun, Nicolas et al., "Design of Hierarchical Porous Carbonaceous Foams from a Dual-Template Approach and Their Use as Electrochemical Capacitor and Li Ion Battery Negative Electrodes", J. Phys. Chem. C, 116: 1408-1421 (2012).

Cai, Qing et al., "A novel porous cells scaffold made of polylactide-dextran blend by combining phase-separation and particle-leaching techniques", Biomaterials, 23: 4483-4492 (2002).

Cameron, Neil R., "High internal phase emulsion templating as a route to well-defined porous polymers", Polymer, 46: 1439-1449 (2005).

Carn, Florent et al., "Three-Dimensional Opal-Like Silica Foams", Langmuir, 22: 5469-5475 (2006).

Chen, Jun et al., "Synthesis of superporous hydrogels: Hydrogels with fast swelling and superabsorbent properties", J. Biomed. Mater. Res., 44: 53-62 (1999).

Choi, Sung-Jin et al., "A Polydimethylsiloxane (PDMS) Sponge for the Selective Absorption of Oil from Water", ACS Appl. Mater Interfaces, 3: 4552-4556 (2011).

Dalton, Tracey et al., "Extent and frequency of vessel oil spills in US marine protected areas", Marine Pollution Bulletin, 60: 1939-1945 (2010).

Darder, Margarita et al., "Progress in Bionanocomposite and Bioinspired Foams", Adv. Mater., 23: 5262-5267 (2011).

Dean, Thomas A. et al., "Food limitation and the recovery of sea otters following the 'Exxon Valdez' oil spill", Mar. Ecol. Prog. Ser., 241: 255-270 (2002).

(Continued)

*Primary Examiner* — Irina S Zemel
(74) *Attorney, Agent, or Firm* — Patrick J. Hagan; Dann, Dorfman, Herrell and Skillman, P.C.

(57) ABSTRACT

Disclosed is a process for fabricating microporous, open-cell foam of a hierarchical structure from a composition comprising a foamable liquid polymer, a curing agent for the polymer, a blowing agent and a filler that functions as a viscosity modifier for the foam-forming composition. By appropriate selection of materials, microporous, open-cell polymer foam is producible which, due to its hydrophobic character, is capable of absorbing relatively low surface tension liquids, e.g., hydrocarbon oils, and reject high surface tension liquids, e.g., water. These foams may be applied in maritime oil spill clean-up operations.

12 Claims, 24 Drawing Sheets

(56) References Cited

OTHER PUBLICATIONS

Dorati, Rossella et al., "Effect of porogen on the physico-chemical properties and degradation performance of PLGA scaffolds", Polymer Degradation and Stability, 95: 694-701 (2010).
Ford, George S., "An investigation into the relationship of retail gas prices on oil company profitability", Applied Economics, 43(27): 4033-4041 (2011).
Garrett, Robert A. et al., "Mortality of sea otters in Prince William Sound following the Exxon Valdez oil spill", Marine Mammal Science, 9(4): 343-359 (1993).
Ghosh, S. et al., "The double porogen approach as a new technique for the fabrication of interconnected poly(L-lactic acid) and starch based biodegradable scaffolds", J. Mater Sci: Mater. Med., 18: 185-193 (2007).
Gong, Xinghou et al., "Fabrication of Graded Macroporous Poly(lactic acid) Scaffold by a Progressive Solvent Casting/Porogen Leaching Approach", Journal of Applied Polymer Science, 125: 571-577 (2012).
Gross, Adam F. et al., "Hierarchical Carbon Foams with Independently Tunable Mesopore and Macropore Size Distributions", Langmuir, 26(13): 11378-11383 (2010).
Hou, Qingpu et al., "Preparation of Interconnected Highly Porous Polymeric Structures by a Replication and Freeze-Drying Process", J. Biomed. Mater. Res., Part B: Appl. Biomater., 67B: 732-740 (2003).
Hrubesh, Lawrence W. et al., "Thermal properties of organic and inorganic aerogels", J. Mater. Res., 9(3): 731-738 (1994).
Huang, Yen-Chen et al., "Fabrication and in vitro testing of polymeric delivery system for condensed DNA", J. Biomed. Mater. Res. 67A: 1384-1392 (2003).
Huerta, Lenin et al., "Nanosized Mesoporous Silica Coatings on Ceramic Foams: New Hierarchical Rigid Monoliths", Chem. Mater., 19: 1082-1088 (2007).
Jones, Julian R. et al., "Optimising bioactive glass scaffolds for bone tissue engineering", Biomaterials, 27: 964-973 (2006).
Juillerat, Franziska Krauss et al., "Self-setting particle-stabilized foams with hierarchical pore structures", Materials Letters, 64: 1468-1470 (2010).
Kim, Taek Gyoung et al., "Macroporous and nanofibrous hyaluronic acid/collagen hybrid scaffold fabricated by concurrent electrospinning and deposition/leaching of salt particles", Acta Biomaterialia, 4: 1611-1619 (2008).
Kohnke, Tobias et al., "Nanoreinforced xylan-cellulose composite foams by freeze-casting", Green Chem., 14: 1864-1869 (2012).
Koyama, Jiro et al., "Toxicity of heavy fuel oil, dispersant, and oil-dispersant mixtures to a marine fish, *Pagrus major*", Fisheries Science, 70: 587-594 (2004).
Lee, Soo-Hong et al., "Thermally Produced Biodegradable Scaffolds for Cartilage Tissue Engineering", Macromol. Biosci., 4: 802-810 (2004).
Li, Jiashen et al., "A one-step method to fabricate PLLA scaffolds with deposition of bioactive hydroxyapatite and collagen using ice-based microporogens", Acta Biomaterialia, 6: 2013-2019 (2010).
Lin, Hong-Ru et al., "Preparation of Macroporous Biodegradable PLGA Scaffolds for Cell Attachment with the Use of Mixed Salts as Porogen Additives", J. Biomed. Mater. Res (Appl. Biomater.), 63: 271-279 (2002).
Lin-Gibson, Sheng et al., "Systematic Investigation of Porogen Size and Content on Scaffold Morphometric Parameters and Properties", Biomacromolecules, 8: 1511-1518 (2007).
Liu, Xin et al., "The economy of oil spills: Direct and indirect costs as a function of spill size", Journal of Hazardous Materials, 171: 471-477 (2009).
Luckarift, Heather R. et al., "Facile Fabrication of Scalable, Hierarchically Structured Polymer/Carbon Architectures for Bioelectrodes", ACS Appl. Mater. Interfaces, 4: 2082-2087 (2012).
Makaya, Kumiko et al., "Comparative stud of silk fibroin porous scaffolds derived from salt/water and sucrose/hexafluoroisopropanol in cartilage formation", Journal of Bioscience and Bioengineering, 108(1): 68-75 (2009).
Mao, Mao et al., "Ice-template-induced silk fibroin-chitosan scaffolds with predefined microfluidic channels and fully porous structures", Acta Biomaterials, 8: 2175-2184 (2012).
Mao, Xiaojian et al., "Porous ceramics with tri-modal pores prepared by foaming and starch consolidation", Ceramics International, 34: 107-112 (2008).
Martins, Leandro et al., "Preparation of hierarchically structures porous aluminas by a dual soft template method", Microporous and Mesoporous Materials, 132: 268-275 (2010).
Mistra, Superb K. et al., :"Poly(3-0hydroxybutyrate) multifunctional composite scaffolds for tissue engineering applications", Biomaterials, 31: 2806-2815 (2010).
Murphy, William L. et al., "Salt Fusion: An Approach to Improve Pore Interconnectivity within Tissue Engineering Scaffolds", Tissue Engineering, 8(1): 43-52 (2002).
Narayan, D. et al., "Effect of pore size and interpore distance on endothelial cell growth on polymers", J. Biomed. Mater Res. 87A: 7100-718 (2008).
Nordvik, Atle B. et al., "Oil and Water Separation in Marine Oil Spill Clean-Up Operations", Spill Science & Technology Bulletin, 3(3): 107-122 (1996).
Nordvik, Atle B., "The Technology Windows-of-Opportunity for Marine Oil Spill Response as Related to Oil Weathering and Operations", Spill Science & Technology Bulletin, 2(1): 17-46 (1995).
Ormseth, O.A. et al., "Ingestion of crude oil: effects on digesta retention times and nutrient uptake in captive river otters", J. Comp. Physiol. B., 170: 419-428 (2000).
Rainer, Alberto et al., "Foaming of Filled Polyurethanes for Fabrication of Porous Anode Supports for Intermediate Temperature-Solid Oxide Fuel Cells", J. Am. Ceram. Soc., 89(6): 1795-1800 (2006).
Scarpa, F. et al., "Dynamic properties of high structural integrity auxetic open cell foam", Smart Mater. Struct., 13: 49-56 (2004).
Scheffler, F. et al., "Zeolite covered polymer derived ceramic foams: novel hierarchical pore systems for sorption and catalysis", Advances in Applied Ceramics, 104(1): 43-48 (2005).
Sepulveda, Pilar et al., "Bioactive sol-gel foams for tissue repair", J. Biomed. Mater. Res., 59P: 340-348 (2002).
Studart, Andre R. et al., "Hierarchical Porous Materials Made by Drying Complex Suspensions", Langmuir, 27(3): 955-964 (2011).
Suzuki, Keisei et al., "Synthesis of mesoporous silica foams with hierarchical trimodal pore structures", J. Mater. Chem., 13: 1812-1816 (2003).
Tariq, F., "The influence of nanoscale microstructural variations on the pellet scale flow properties of hierarchical porous catalystic structures using multiscale 3D imaging", Chemical Engineering Science, 66: 5804-5812 (2011).
Texter, John et al., "Templating hydrogels", Colloid Polym. Sci., 287: 3131-321 (2009).
Thomson, Robert C. et al., "Hydroxyapatite fiber reinforced poly (alpha-hydroxy ester) foams for bone regeneration", Biomaterials, 19: 1935-1943 (1998).
Tondi, G. et al., "Tannin-based rigid foams: A survey of chemical and physical properties", Bioresource Technology, 100: 5162-5169 (2009).
Tran, Richard T. et al., "A new generation of sodium chloride porogen for tissue engineering", Biochemistry and Molecular Biology, 58(5): 335-344 (2011).
Vakifahmetoglu, Cekdar et al., SiOC Ceramic Monoliths with Hierarchical Porosity"," Int. J. Appl. Ceram. Technol., 7(4): 528-535 (2010).
Vaquette, Cedryck et al., "An Innovative Method to Obtain Porous PLLA Scaffolds with Highly Spherical and Interconnected Pores", J. Biomed. Mater. Res. Part B: Appl. Biomater. 86B: 9-17 (2008).
Verdejo, R. et al., "Enhanced acoustic damping in flexible polyurethane foams filled with carbon nanotubes", Composites Science and Technology, 69: 1564-1569 (2009).
Wang, X.S. et al., "Size-dependent effective modulus of hierarchical nanoporous foams", EPL, 92: 16004 (2010).
Wei, Guobao et al., "Macroporous and nanofibrous polymer scaffolds and polymer/bone-like apatite composite scaffolds generated by sugar spheres", J. Biomed. Mater. Res. 78A: 306-315 (2006).
Wong, Joanna C.H. et al., "Designing macroporous polymers from particle-stabilized foams", J. Mater. Chem., 20: 5628-5640 (2010).

(56) References Cited

OTHER PUBLICATIONS

Wong, Ling L. et al., "Macroporous Polymers with Hierarchical Pore Structure from Emulsion Templates Stabilised by Both Particle and Surfactants", Macromol. Rapid Commun., 32: 1563-1568 (2011).
Yang, Heqin et al., "Synthesis and catalytic performances of hierarchical SAPO-34 monolith", J. Mater. Chem., 20: 3227-3231 (2010).
Yang, Yanfang et al., "Formation of Porous PLGA Scaffolds by a Combining Method of Thermally Induced Phase Separation and Porogen Leaching", J. Appl. Polym. Sci., 109: 1232-1241 (2008).
Zhang, Hui et al., "Preparation of $TiO_2$, $CeO_2$, and $ZrO_2$ hierarchical structures in "one-pot" reactions", Journal of Colloid and Interface Science, 333: 764-770 (2009).

* cited by examiner

OPEN-CELL FOAM FOR THE SELECTIVE ABSORPTION OF OIL FROM WATER

CROSS-REFERENCE TO RELATED APPLICATIONS

The present application claims the benefit of U.S. Provisional Patent Application No. 61/771,249, filed Mar. 1, 2013, the entire disclosure of which is incorporated by reference herein.

FIELD OF THE INVENTION

The present invention relates to a novel process of foaming a liquid pre-polymer matrix which is then crosslinked into a solid and hierarchically structured open-cell foam. The invention also relates to a composition for forming the open-cell foam, the open-cell foam product and a method of using the foam product for the removal of oil from a body of water, e.g., an oil spill.

BACKGROUND OF THE INVENTION a. Polymer Foam Technology

Open-cell foams have many applications, including bioscaffolds[1-3], high surface area catalysts[4, 5], filters[6], battery-capacitors and fuel cell electrodes [7, 8], vibration/acoustic dampers[9, 10], thermal insulation[11, 12], and sorbents[13, 14]. Polymeric open-cell foams are of particular interest due to their relatively low cost, low weight and wide range of physical and mechanical properties.

There are four basic mechanisms of manufacturing polymer foams: gaseous blowing agents, liquid blowing agents, emulsion templating and porogen (a solid particulate pore former) leaching. These mechanisms can produce both open and closed cell foams, with the transition between the two structures relying upon the percentage avoid space created in the particular foam matrix [15]. Each of the basic mechanisms can be broken down into a variety of specific methods. For example, a gaseous blowing agent can be physically blown/injected into a viscous polymer and then heated to expand into pores, or gas molecules could be a byproduct of the polymerization reaction and collected into bubbles that become the cells of the foam[16]. A blowing agent that does not undergo a chemical reaction during the foaming process is termed a physical blowing agent, whereas chemical blowing agents create gases from a chemical reaction. Of course, each of these methods has its advantages and drawbacks. Gas bubbles (or liquid droplets) generated by gaseous blowing agents, liquid blowing agents and emulsion templates need to be stabilized (usually with a surfactant) to prevent their coalescence so that large voids do not occur in the final polymer foam. The bubbles/droplets in these known methods can also be stabilized by low surface energy particles at the bubble (or droplet) interface or by both particles and surfactants. The latter means of stabilization results in the formation of a hierarchical pore structure, i.e., an array of pore sizes of different length scales, i.e., a variety of micropores and macropores. The small pores are due to surfactant stabilized droplets and larger pores are due to particle stabilized droplets [17]. A hierarchical pore structure gives foams improved absorption capabilities over uniform cell size foams due to the differing transport rates of fluids through large and small pores in the foam's structure[18], as well as improved mechanical properties[19].

Porogen leaching methods generally do not have to be stabilized, but the solid porogen must be removed from the polymer matrix, which can be a cumbersome and wasteful process, especially as the size of the porogen (and hence pores of the foam) is reduced. However, templating and subsequent leaching of solid fillers is one of the simplest and most robust techniques for creating open-cell structures. Common solid porogens include sugar (sucrose)[20-30] and salt (sodium chloride)[23, 28-40] because they are easily dissolved in water, as opposed to polymeric porogens or fillers that require the use of organic solvents for dissolution. Ice has also been shown to be an effective solid porogen[41-43], as it can easily be melted away.

There are other more complex methods of creating polymer foams, such as using micelles to create the pores of the foam [44, 45] or by stabilizing aqueous foams solely by polymer particles at the liquid-gas interface and then sintering the polymer particles into one solid structure [46-49].

Just as there are many methods of creating polymer foams, there are also many different types of polymers from which foams can be created. Foams having a wide range of properties may be made from thermoplastic and thermoset polymers, biopolymers, hydrophobic and hydrophilic polymers and elastomers. Commonly foamed polymers include polystyrene (especially for consumer food containers), polyurethane, polyvinylchloride, polypropylene, polyethylene and silicone.

b. Oil Spill Remediation Technology

The release of petroleum hydrocarbons into a marine or other aqueous environment, commonly known as an oil spill, has tremendous negative environmental and economic impacts [50-51] and are extremely costly and time consuming to clean up. Environmental repercussions of oil spills include the loss of animal life and habitats, and the introduction of harmful chemicals into their food supply [52-57]. Aside from the obvious economic effects of reduced profits to oil companies and increased gasoline prices [58], oil spills can destroy the main source of income for fishing communities and create economic downturns in travel destinations [59]. In the case of the British Petroleum Gulf of Mexico oil spill in 2010 over $20 billion has been set aside for litigation and environmental remediation costs [60].

The catastrophic nature of oil spills has provided impetus for the development of remediation techniques, including various methods for effectively removing oil from water. There exist large and expensive equipment that use oleophilic (likes oil)/hydrophobic (hates water) spinning disks to selectively adsorb oil to their surface as a protrusion scrapes the oil off. However, these machines are only effective close to the site of the spill where the concentration of oil is large [61, 62]. A centrifuge that spins a mixture of oil and water can also be used to separate oil from water based on their different densities, as the oil will remain in the center of the centrifuge while the water is pushed to the edges [61]. These machines can process large volumes of contaminated water; however the concentration of oil in the processed water would still be above the environmentally safe level of 10 ppm [57, 63]. Skimmers, as their name implies, attempt to skim the oil slick off of the surface of the water, although they require calm water to be effective[64]. These techniques are used where there is a high concentration of oil, usually near the site of the spill, but are not effective as the oil slick spreads far away [65-67]. Dispersants are used to break up an oil slick into oil droplets that can be diluted into the volume of the water rather than coalesce at the surface. Dispersants themselves tend to be toxic, especially in conjunction with oil [57, 68].

Further away from the site of the spill, absorbent materials can be used as they can more selectively absorb oil that exists in lower concentrations [69]. Though oil and water are immiscible, most porous, spongy materials will readily absorb both oil and water [70, 71]. This is undesirable because the oil tends to create a thin film on the surface of the water that is easily emulsified (albeit unstably), with the result that water is just as likely to be absorbed as the oil. This makes non-selective absorbent materials uneconomical for oil cleanups.

Silicone open-cell foams are of particular interest because they have been shown to be able to separate oil from water due to the inherent hydrophobicity and oleophilicity of silicone [22]. This property coupled with a high chemical resistance, a low glass transition temperature (−125° C.) and stability at high temperatures[72] make silicone foams ideal for cleaning up oil spills in harsh environments. Not only are the physical properties of the silicone foam important, but so is the morphology of the cellular structure. Recently there has been much interest in creating hierarchical pore morphologies in foams[73-82] due to their improved mechanical and physical properties.

SUMMARY OF THE INVENTION

In accordance with one aspect of this invention, there is provided a novel process for producing a functional microporous, open-cell foam. The process involves a combination of porogen/filler leaching and liquid blowing agent techniques, which is capable of creating hierarchical polymeric foam, preferably silicone foam. The porogen or filler particles are mixed into the blowing agent to create a suspension that is then emulsified with the pre-polymer/curing agent mixture to create a suspo-emulsion (an emulsion in which one of the phases is a suspension). Upon heating, the blowing agent expands to create bubbles and the pre-polymer is solidified via a curing agent present in the emulsion. Finally, the porogen/filler particles are dissolved away to form intercellular passages, windows or channels in the resulting foam. This method is unique in that the suspo-emulsion from which the foam is produced is stabilized not by particles at the interface or by surfactants, but by the increase in viscosity from the addition of filler particles in the bulk of the blowing agent phase. Thus, low surface energy (generally polymeric) particles are not required for this technique, nor are surfactants, both of which can be environmentally problematic if they were to leach out of the foam.

From the following detailed description, it will be appreciated that the blowing agent helps to create a continuous network of pores and channels from which the filler can be extracted at relatively low filler concentrations, and that the viscosity of low molecular weight polymers can be modified with fillers to trap liquid blowing agents. Additionally, the removal of the filler particles and the expansion of the blowing agent leads to a hierarchical pore structure which is controllable by adjusting the concentrations of the blowing agent and filler.

According to another aspect, this invention provides a polymer foam-forming composition used in the above-described process. The composition comprises a foamable liquid polymer, curing agent for the polymer, a blowing agent and a soluble, solid viscosity modifier.

In yet another aspect of the invention, there is provided a microporouos open-cell foam of hierarchical structure produced by the above-described process, after curing of the composition and extracting the solid viscosity modifying filler from the foamed mass.

According to a further aspect of this invention, there is provided a method for removing oil from a body of water contaminated therewith, together with concomitant recovery of the oil. The method comprises contacting the oil with the above-described microporous, open-cell polymer foam, which causes oil to be absorbed in and on the foam material and separating and recovering the oil from the foam.

As can be seen in the following examples, the open-cell foam of hierarchical structure described herein is sufficiently strong and resilient as to be capable of being compressed between mechanical rollers, or other compression apparatus and upon release from compression return substantially to its original form.

BRIEF DESCRIPTION OF THE DRAWINGS

(FIG. 6B) is an example of mesoscale pores found in these foams. All scale bars are 200 microns, except for (FIG. 6B) which has a scale bar that is 2 microns.

FIG. 8A shows a foam having a 1.03 g/mL IPA conc.; FIG. 8B is a close up of the structure shown in FIG. 8A; FIG. 8C shows a foam having a 1.24 g/mL IPA conc; FIG. 8D shows a foam having a 1.44 g/mL IPQ conc.; FIG. 8E shows a foam having a 1.65 g/mL IPA conc.; and FIG. 8F shows a foam having a 1.86 g/mL IPA conc.

DETAILED DESCRIPTION OF THE INVENTION

Various curable liquid polymers may be used to form the open-cell polymer foam matrix. Good results have been obtained using silicone elastomers. Polyorganosiloxane elastomer (prepolymer)/curing agent combinations are commercially available. One such product is Sylgard 184 (Dow Corning, Midland, Mich.). A suitable polydimethyl siloxane (PDMS) prepolymer and curing agent composition comprises: 55%-75% (by weight) dimethyl, methylhydrogen siloxane (CAS# 68037-59-2) 15%-35% dimethyl siloxane, dimethylvinyl-terminated PDMS (CAS# 68083-19-2) 10%-30% dimethylvinylated and trimethylated silica (CAS# 68988-89-6) 1%-5% Tetramethyl tetravinyl cyclotetrasiloxane (CAS# 2554-06-5). A field emission scanning electron micrograph (FE-SEM) showing the cross-section of a foam made from such a polymer is presented in FIG. 6.

Figure 3:
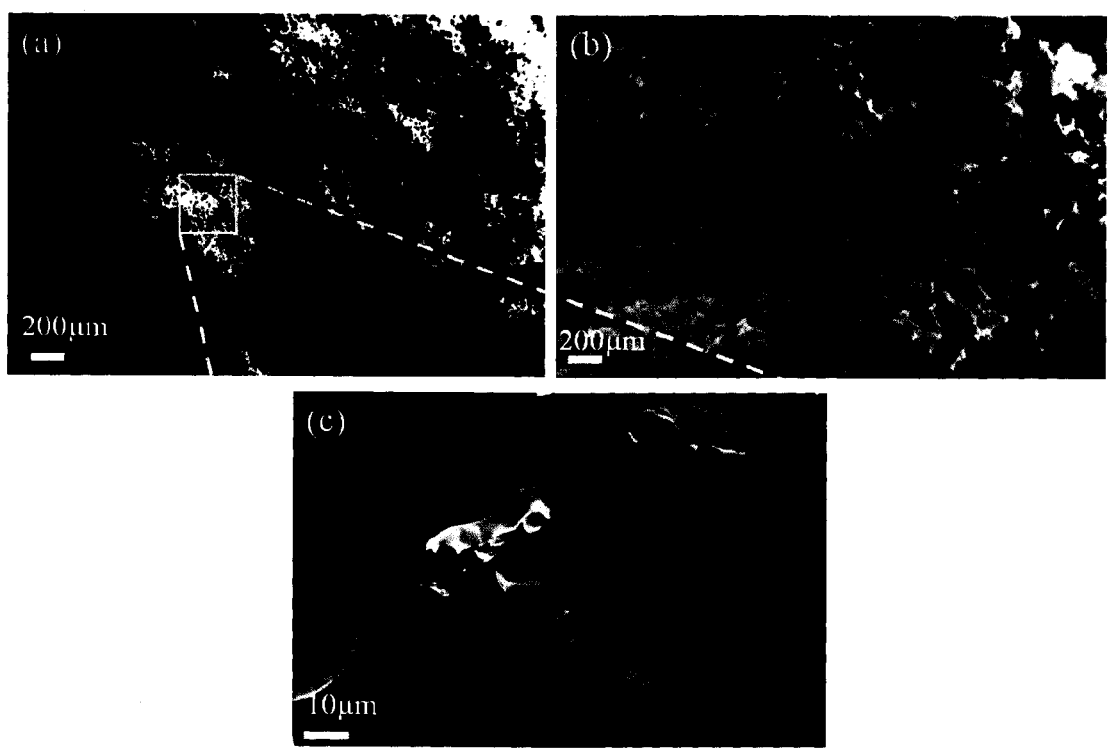
FIG. 3. FE-SEM micrographs of (a) foam products obtained by the process of the invention using a composition composed of 1.02 g/mL isopropanol, 3.09 g/mL powdered sugar and 4.85 mL epoxy resin. (a) is a micrograph of the foam that results from carrying out the process at 25° C., (b) is the foam from the process being carried out at 60° C., and (c) is a close up showing small divots on the cell walls.
Figure 8A:
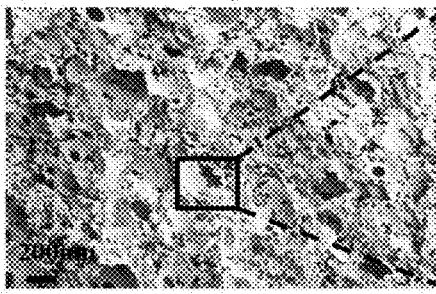
FIG. 8A-FIG. 8F. FE-SEM micrographs of foams that all have 5.15 g/mL of sugar and 4.85 mL of PDMS with different isopropanol concentrations (IPA conc.). All scale bars are 200 microns.
Figure 8B:
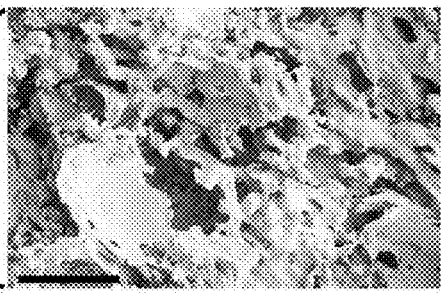
Figure 8C:
Figure 8D:
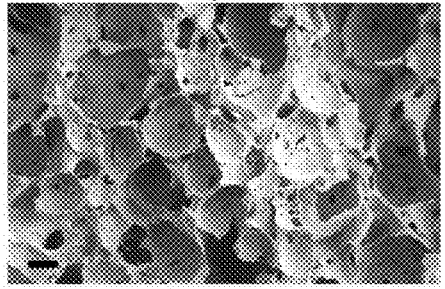
Figure 8E:
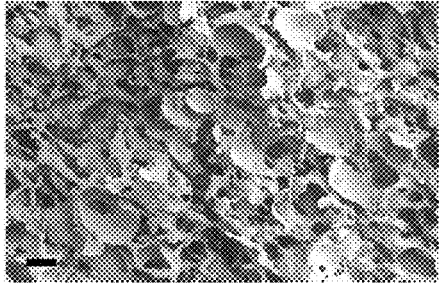
Figure 8F:

Polyepoxide polymers, e.g., polyepoxide 635 Thin Epoxy Resin and Hardener (U.S. Composites, Inc.) have also performed satisfactorily, FIG. 3(a)-(c) shows a FE-SEM image of the foam product made using the process of the invention with curable epoxy resin (4.85 mL), powdered sugar (3.09 g/mL) and isopropanol (1.02 g/mL), which is similar in structure to PDMS foam including a high loading of sugar and a low loading of isopropanol (compare FIG. 8(a)).

Other suitable, curable polymers capable of producing useful foam materials in accordance with this invention include polyurethane, polystyrene, polyvinylchloride, polypropylene and polyethylene.

Physical blowing agents are preferred for use in the practice of this invention, especially volatile liquid blowing agents. Suitable liquid blowing agents include straight and branched chain aliphatic alcohols having 1-4 carbon atoms, straight and branched chain aliphatic hydrocarbons having 4-9 carbon atoms and fully and partially halogenated aliphatic hydrocarbons having 2-4 carbon atoms. Particularly good results have been obtained using isopropanol as the blowing agent.

Figure 4:
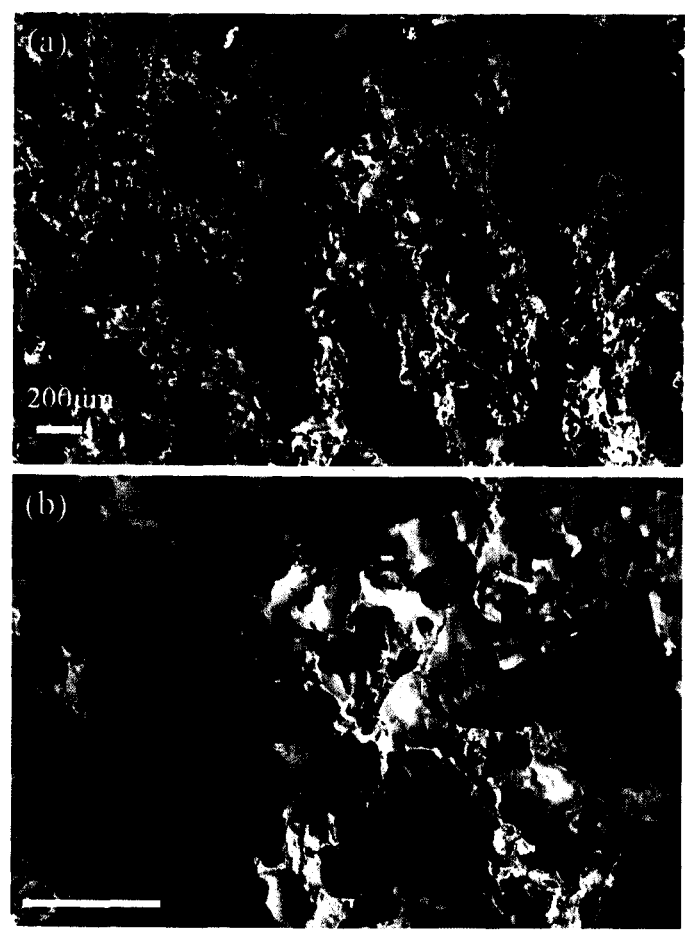
FIG. 4. FE-SEM micrographs of a foam product obtained using sodium bicarbonate ($NaHCO_3$) as the filler. The hierarchical structure is clearly visible in (a). (b) is a close up of (a). All scale bars are 200 μm.

The soluble porogen/filler or fugitive phase is selected from the group of water-soluble powdered carbohydrate, powdered sodium chloride and powdered sodium bicarbonate. Although powdered sugar is used in the example provided below, sodium bicarbonate (Church & Dwight Co., Inc.) and sodium chloride (Morton Salt) were also used as solouble solid fillers. These solid fillers also have low solubility in isopropanol, which enables thick slurries to be made at low filler concentrations. FIGS. 4(a-b) are FE-SEM micrographs of the PDMS foam made using sodium bicarbonate as the filler. The hierarchical structure of the foam can be seen in these images.

The above-mentioned components are mixed together, based on prescribed concentrations, and then heated at an elevated temperature for a time sufficient to cure the polymer matrix. The solid porogen/filler will eventually be dissolved from the solidifier (rubber-like) foam, producing microporous, open-cell foam of hierarchical structure. The term "microporous", as used herein, refers to very small pores or channels having diameters in the micron or nanometer range. In specific embodiments exemplified below, the foam micropores have diameters of about 10 microns and greater. Of course, if smaller particle size porogen/filler is used, e.g., 0.1-10 microns, the pore size will be correspondingly smaller.

One of the unique features of the process of making polymeric, microporous open-cell foam, as described herein, is that the liquid blowing agent is first mixed with the soluble, solid porogen/filler before it is added to the liquid elastomer.

Figure 1:
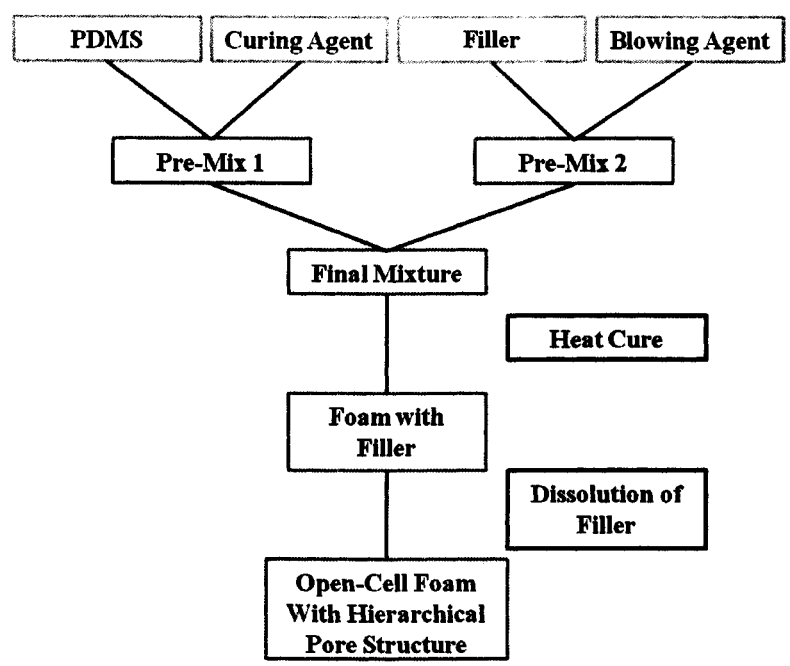
FIG. 1. A flow diagram representing the production process of open-cell hierarchical foams.
Figure 2:
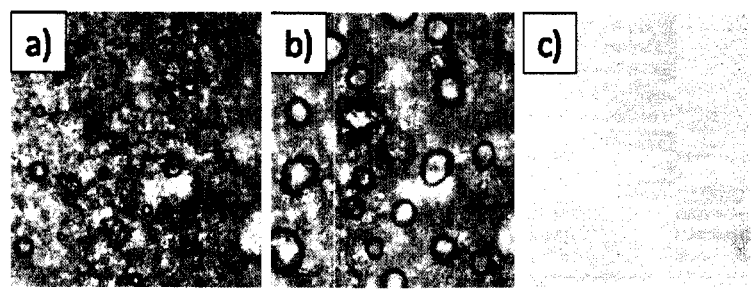
FIG. 2. Optical images of bubbles of isopropanol in a thin film of a mixture of isopropanol/PDMS/sugar under a microscope: (a) immediately after mixing and (b) after twenty minutes at room temperature. (c) A mixture of only isopropanol and PDMS shows no bubble formation after 20 minutes.

The added porogen/filler plays a very important role by modifying the viscosity of the mixture. As the mixture cures at elevated temperature, the droplets of volatile liquid blowing agent will expand and tend to escape the sample quickly. However, the increase in viscosity of the mixture, due to the added porogen/filler, prevents their coalescence and rapid escape. To evaluate the role of the added porogen/filler, the time evolution of two foamable compositions comprising isopropanol, PDMS and powdered sugar as the insoluble porogen/filler was monitored under a microscope. FIGS. 2(a) and 2(b) show the expansion of the isopropanol in 1 millimeter thick film of the foamable composition immediately and after 20 minutes at room temperature. FIG. 2(c) shows a mixture of only isopropanol/PDMS. No bubble formation is observable after 20 minutes because the isopropanol is not trapped in the mixture and has easily escaped the film.

The curing temperature governs the final morphology of the foam. As the curing temperature increases, the volatile liquid blowing agent expands more rapidly. This tends to explain the chaotic structure of the open-cell foams cured at higher temperature.

The next step in the process is to wash out or extract any excess porogen/filler from the cured foam. This can be easily done by placing the foam in a water stream for a few minutes while applying oscillating compression.

The tensile strength of bulk silicone rubber is 2.24 MPa. Therefore, it may be necessary to enhance the foam's tensile strength to prevent damage to the foam, e.g., tearing, especially after repeated usage. One strategy would be to strengthen the foam microstructure by introducing reinforcing solid fillers, i.e., carbon fibers, metallic nanoparticles or the like, into the uncured mixture. These fillers, among others, have been shown to increase the tensile strength of bulk silicone rubber. An alternative strategy would be reinforce or surround the foam, e.g., in the form of sheets or panels of pre-determined dimensions, with a high tensile strength mesh wrapper, i.e., steel wire or a compatible polymer, to allow the use of relatively large sheets in clean-up operations. Preferably, the product foam is free of such reinforcing fillers in order to keep the cost down, so the latter approach is favored in the event of inadequate tensile strength.

The open-cell structure of the resulting foam, in addition to its intrinsic oleophilic-hydrophobic surface property, low glass transition temperature and chemical resistance against low molecular weight organic compounds all combine to make the foam product capable of reversibly absorbing oil (petroleum-based, as well as vegetable oil), while repelling water. As a result, in comparison to a material that absorbs both oil and water, much less foam is needed to absorb the same volume of oil. In addition, the foam may be reused multiple times.

There are a number of distinct advantages that recommend the open-cell foam of the present invention for commercial use in oil spill remediation. These include, without limitation, low cost, reusability, rapid and simple production process, scalability, and excellent thermal stability at both low and high temperature.

The following examples describe the invention in further detail. These examples are provided for illustrative purposes only, and should in no way be construed as limiting the scope of the invention.

EXAMPLE 1

Open-Cell Foam Production Process

A flow diagram of the production process is shown in FIG. 4. First, a given mass of the porogen/filler (powdered sugar—maximum particle size 75 microns) is weighed into a container on a milligram scale (Mettler Toledo), followed by the addition of a given mass of liquid blowing agent (isopropanol 70%; water 30%). Powdered sugar is only slightly soluble in isopropanol which allows slurries to be made at relatively low sugar concentrations as compared to water. These two components are mixed manually for 30 seconds, and then in a high shear centrifugal mixer (Thinky AR-100) at 2000 RPM for 1 minute to create the blowing agent/filler slurry forming the inner phase of the suspo-emulsion. In a separate container, a mixture of polydimethylsiloxane (PDMS) elastomer base and crosslinker is prepared with the components in a 10:1 ratio, respectively. This combination is mixed manually for 30 seconds, and then in the high shear centrifugal mixer at 2000 RPM for 1 minute. This mixture becomes the outer phase of the suspo-emulsion, and thus, the foam. Next, 4.85 mL of the PDMS base/crosslinker mixture is added into the isopropanol/sugar slurry to create the precursor to the blowing agent slurry/polymer suspo-emulsion. The final slurry/polymer suspo-emulsion is created by mixing the precursor mixture for 1 minute manually and 2 minutes at 2000 RPM in the centrifugal mixer. Additionally, the suspo-emulsion is de-foamed in the centrifugal mixer for a time sufficient to remove air bubbles that are entrained during mixing and to ensure the homogeneity of the resulting foam composition.

The suspo-emulsion is then placed in the oven at a prescribed temperature for 1 hour to crosslink (cure) the PDMS and to cause the liquid isopropanol to vaporize and form bubbles. After curing, slight and variable compression is applied to the foam while under a stream of distilled water to promote water infiltratation of the pores of the foam to aid in dissolving the sugar particles. The samples are then placed in a container of water for 12 hours to ensure the removal of residual sugar particles. Once the sugar is substantially dissolved, the hierarchical foam structure is realized. The samples are then dried in a convection oven for 4 hours at 80° C. to completely cure the polymer and vaporize the blowing agent, resulting in the formation of the final cellular foam structure.

As described in subsequent examples, three parameters were systematically varied in order to determine their influence on the structure and the mechanical properties of the resulting foams: isopropanol concentration, powdered sugar concentration, and the curing temperature.

Disposable containers chemically resistant to isopropanol and having melting temperatures well above 80° C. were used to contain the mixtures and emulsions that resulted from the various stages of the production process. The foam was produced in 90 mL polystyrene cups and in 22 mL glass vials.

The PDMS used in this example was purchased in the form of the Sylgard 184 elastomer base and crosslinker kit (Dow Corning) and was used as the foamable polymer matrix. PDMS can be cured over a wide temperature range, allowing the blowing agent to be tested at several different temperatures.

a. Process Temperature

The foaming process is highly temperature dependent because the rate of curing of the PDMS and the rate of vaporization of the isopropanol are both temperature dependent. Therefore, the influence of these two dynamic parameters on the resulting foam is important. It is reasonable to assume that the faster the PDMS cures, the less time the isopropanol has to vaporize and expand. The standard curing temperature of PDMS is 65° C. and the boiling point of 70% isopropanol/30% water is 80.4° C., so they are within approximately 15° C. of each other. A solution of 70% isopropanol/30% water forms an azeotrope (a mixture of two liquids that has a constant boiling point), so the separation of water and isopropanol will not occur during the vaporization process.

b. Phase Diagram

The percentage of the liquid PDMS phase versus the percentage of the sugar in isopropanol suspension phase has an affect on the structure of the emulsion. An increase in the percentage of the inner phase (the sugar in isopropanol suspension) can cause phase inversion, i.e., the inner phase becomes the outer phase. Conversely, a reduction in the percentage of the outer phase (the liquid PDMS) can also cause phase inversion. If the emulsion is unstable, then phase separation can occur and the inner phase and outer phase will separate and stack by density in the container (PDMS on top of sugar/isopropanol). Since one of the phases of this emulsion is a suspension of particles in a liquid, it is a type of emulsion termed suspo-emulsion.

Figure 5:
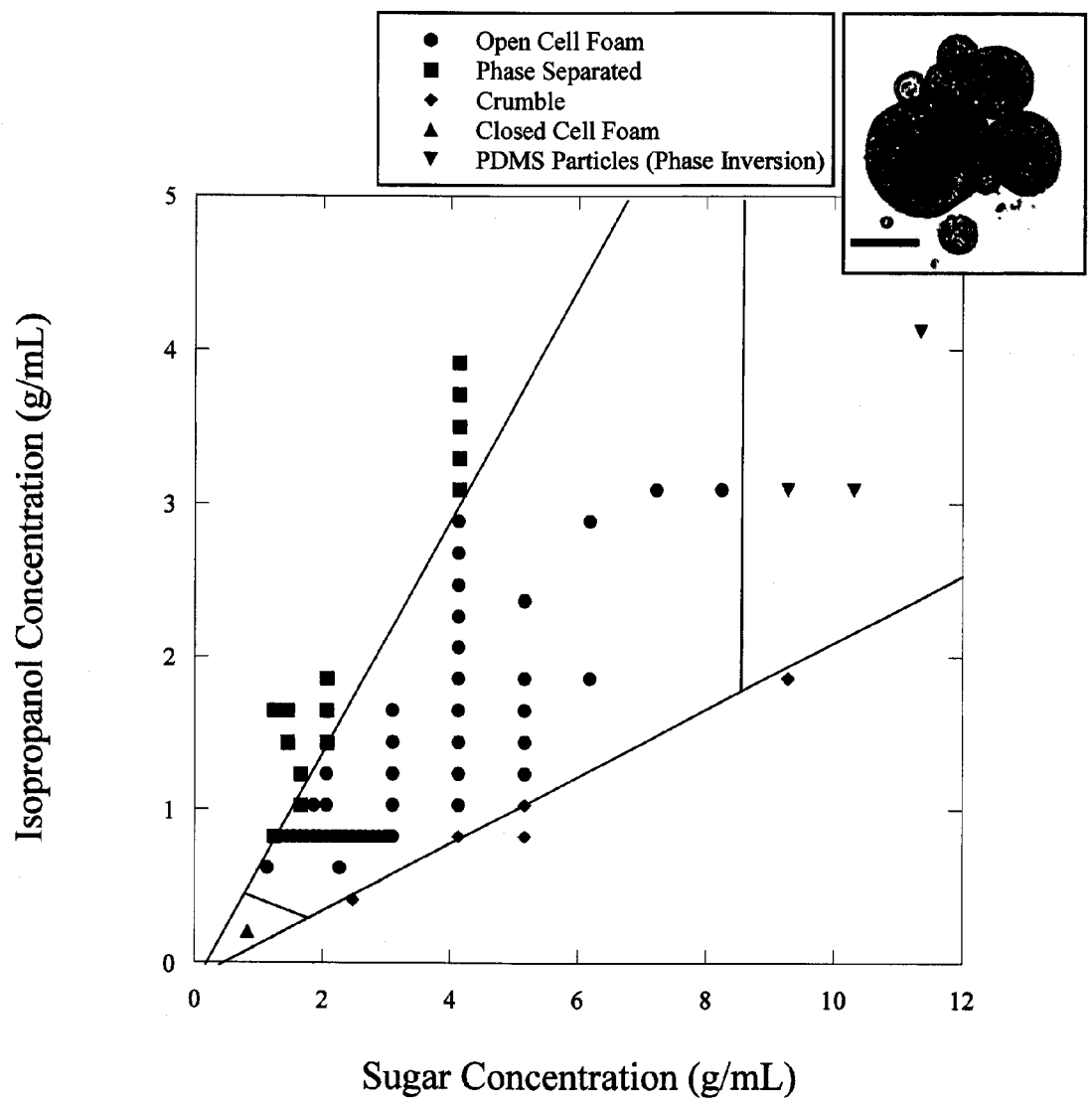
FIG. 5. The phase diagram for the production process with the volume of PDMS held constant at 4.85 mL and the curing temperature held constant at 80° C. The inset image is a micrograph of PDMS particles (scale bar 300 μm) generated from the phase inverted section of the phase diagram.
Figure 6A:
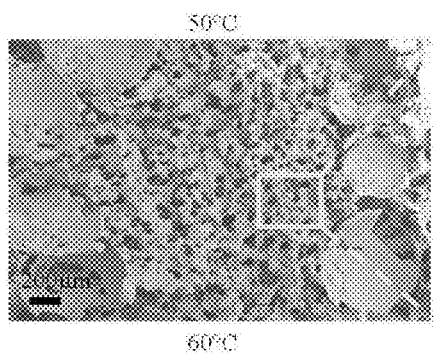
FIG. 6A-FIG. 6F. FE-SEM micrographs of the cross section of foams prepared using a composition composed of 1.86 g/mL isopropanol, 4.12 g/mL sugar and 4.85 mL PDMS at different curing temperatures (FIG. 6A) and (FIG. 6C)-(FIG. 6F).
Figure 6B:
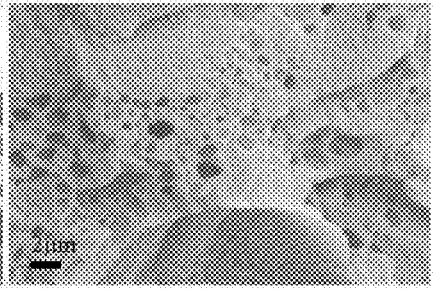
Figure 6C:
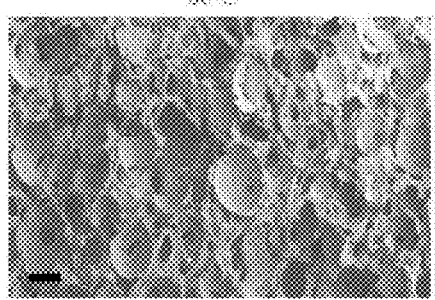
Figure 6D:
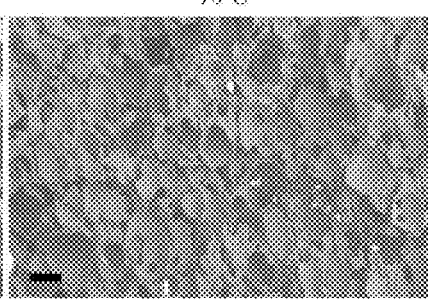
Figure 6E:
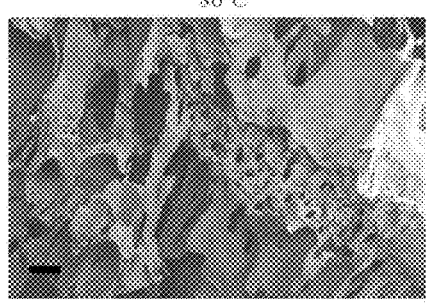
Figure 6F:
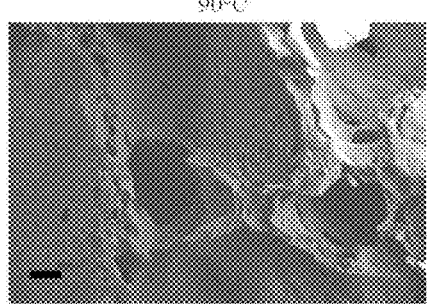

A phase diagram for the PDMS/sugar/isopropanol suspo-emulsion is shown in FIG. 5. For each of the compositions in the phase diagram the volume of PDMS was held constant at 4.85 mL with the elastomer base to crosslinker ratio held constant at 10:1. Additionally, the curing temperature was held constant at 80° C. (approximately the boiling point of the 70% isopropanol/30% water azeotrope). At the bottom left hand corner of the phase diagram there is a low concentration of sugar and a low concentration of isopropanol and in this region a closed cell foam results after curing. It is difficult to dissolve any of the sugar out of the foam in this region. Increasing the sugar concentration without increasing the isopropanol concentration brings the system into a region where an open cell foam results after curing, but the structure is fragile and the foam crumbles apart when the sugar is dissolved away. Increasing the isopropanol concentration from this point brings the system toward the center of the phase diagram, where an open-cell hierarchical foam is formed after curing. It is in this region that PDMS constitutes the outer phase of the emulsion and sugar/isopropanol constitutes the inner phase. Increasing the concentration of isopropanol from this region brings about phase separation, in which the isopropanol and sugar migrate to the bottom of the container and the PDMS migrates to the top during the curing phase. Increasing the sugar concentration from this region can restore stability to the system, such that open-cell hierarchical foam is produced. Increasing the concentration of sugar even further will push the system to a phase inversion point, causing the PDMS to become the inner phase of the emulsion and sugar/isopropanol to become the outer phase of the emulsion. PDMS particles are created after curing when the system is in this region, as seen in the inset image in FIG. 5.

Notably, the addition of sugar prevents phase separation from occurring, while the addition of isopropanol can cause phase separation. It is reasonable to assume that the sugar particles in the bulk are stabilizing the system because the addition of particles will increase the viscosity of the isopropanol/sugar phase (which is clearly noticeable during mixing). Additionally, the thinning effect of adding more isopropanol causes the suspo-emulsion to become less stable. The stability of a specific composition of the suspo-emulsion can be predicted by the equation that forms the line separating the phase separation region from the open cell foam region of the phase diagram in FIG. 5, as:

$$C_{IPA}=0.83C_{SU}-0.34 \quad (1)$$

Where $C_{IPA}$ is the concentration of isopropanol and $C_{SU}$ is the concentration of sugar. This equation will give the maximum isopropanol concentration that can be used for a given sugar concentration without phase separation, when the temperature is 80° C. The equation for the lower bound where foams begin to crumble apart is:

$$C_{IPA}=0.23C_{SU}-0.16 \quad (2)$$

This equation will give the maximum sugar concentration that can be used for a given isopropanol concentration without causing the foam to crumble, when the processing temperature is set to 80° C. These two equations are only valid between sugar concentrations of ~0.5 g/mL, where closed cell foams results, and ~9 g/mL, where phase inversion will start to occur.

EXAMPLE 2

Assessment of Physical and Mechanical Properties of Open-Cell Foam

1. Foam Morphology

In this example, three variables were shown to greatly influence the morphology (and thus the material properties of the open-cell foam produced according to Example 1): curing temperature, sugar concentration, and isopropanol concentration. All experiments described below were performed in the open-cell foam region of the phase diagram (FIG. 5).

FE-SEM micrographs were taken to compare the cell morphology of each of the foam samples. The samples were prepared for the FE-SEM using the freeze fracture technique. The foam samples were placed in liquid nitrogen for 1 minute to bring them below the glass transition temperature of PDMS. The samples became brittle, and were easily fractured. This freeze fracturing process allowed images of unadulterated foam to be taken, as normal cutting of foam results in damage to the pores of the foam. Since PDMS is an electrical insulator and the FE-SEM requires the surface of an object to be electrically conductive for proper imaging, all samples were sputter coated with a thin film of 25 nm thick gold. All presented images are thus of the fractured and gold coated surfaces.

a. Effect of Curing Temperature

The curing temperature was varied from 50° C. to 90° C. in increments of 10° C. For these trials the composition of the foam was held constant with an isopropanol concentration of 1.03 g/mL, a sugar concentration of 2.06 g/mL and the volume of PDMS was 4.85 mL. FIGS. 6(a-f) show the pore morphologies at each curing temperature. At a curing temperature of 50° C. it is apparent that the morphology of the foam is more heavily influenced by the pores formed from the sugar particles than pores formed from isopropanol bubbles. This is evidenced by the lack of many large cells formed from the expansion of the isopropanol.

In comparison to 50° C., the 60° C. sample also shows cells formed from the expansion of the isopropanol, however, there are many more of these cells. There is not an appreciable difference between the sample prepared at 60° C. and the sample prepared at 70° C. as both display a similar pore structure. The samples prepared at 80° C. and 90° C. show more chaotic cell structures which are likely due to the rapid expansion of isopropanol and coalescence of the isopropanol bubbles. It is apparent that pores are formed by both mechanisms at every temperature that was evaluated, however, at 50° C. the sugar particle have more influence on the structure than the isopropanol does, at 60° C. and 70° C. the influence of the isopropanol becomes more apparent, and at 80° C. and 90° C. the isopropanol causes a chaotic cell structure and the sugar particle voids are not as apparent as they were at the lower temperatures.

b. Effect of Sugar Concentration

Figure 7:
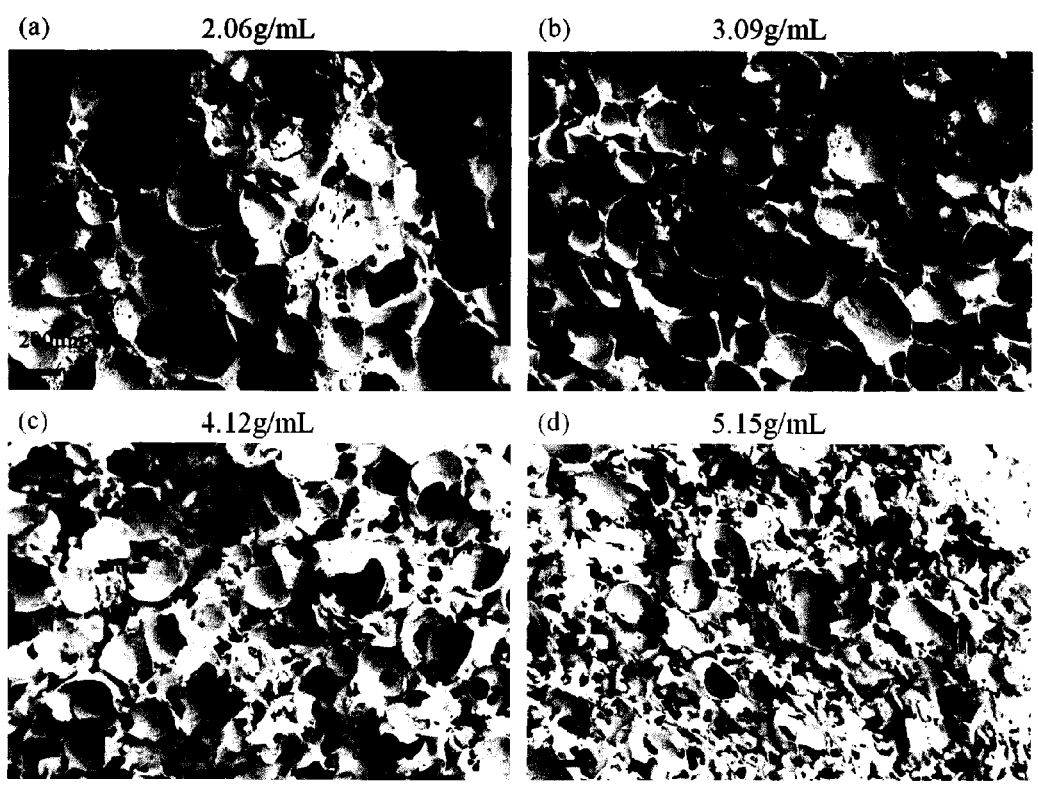
FIG. 7. FE-SEM micrographs of foams that all have 1.44 g/mL of isopropanol and 4.85 mL of PDMS, with various sugar concentrations.

For the set of images shown in FIGS. 7(a-d) the concentration of sugar was varied from 2.06 g per milliliter of PDMS to 5.15 g per milliliter of PDMS in 1.03 g/mL increments, while the other parameters were held constant. The curing temperature was held at 80° C., the concentration of isopropanol in PDMS was held constant at 1.44 g/mL and the volume of PDMS was held constant at 4.85 mL. At a sugar concentration of 2.06 g/mL the isopropanol appears to be the dominant pore generator, though there are smaller pores in the cell walls that are formed by the removal of the embedded particles of sugar. At a sugar concentration of 3.09 g/mL there are sugar particle aggregates that surround the cell walls generated by the isopropanol. PDMS also surrounds the aggregated sugar particles and thus, the dissolution of the sugar creates an array of PDMS cells created by isopropanol expansion that is connected by PDMS lamellae created around the sugar particles. This is comparable to foam formed from surfactant stabilized polymer emulsions, in which the polymeric outer phase forms films between domains of the liquid inner phase. However, the structure of the present foam is more complex because the inner phase is a suspension of particle in a volatile liquid. At a sugar concentration of 4.12 g/mL the cells formed from isopropanol become less prevalent and the smaller chaotic cells formed by the powdered sugar become more prevalent. This trend continues and at a sugar concentration of 5.15 g/mL the cell structure is reversed as the sugar dissolution becomes the dominant pore generating mechanism.

c. Effect of Isopropanol Concentration

The set of images in FIGS. 8(a-f) displays the variation of the concentration of isopropanol from 1.03 g/mL of PDMS to 1.86 g/mL in ~0.20 g/mL increments, while holding the curing temperature at 80° C., the concentration of sugar at 5.15 g/mL and the volume of PDMS at 4.85 mL. When the concentration of isopropanol is 1.03 g/mL the morphology of the foam is dominated by the relatively high concentration of sugar as it displays a fine structure caused by the dissolution of the sugar. There are very few cells formed from the expansion of the isopropanol in this case. As expected, increasing the concentration of isopropanol to 1.24 g/mL resulted in increasing the number of cells formed by the expansion of isopropanol. The trend continues as the isopropanol concentration is increased to 1.44 g/mL and 1.65 g/mL with more lamellae between isopropanol cells forming as well. When the isopropanol concentration is 1.86 g/mL the structure displays two interpenetrating networks of the pores formed by the two pore generating agents. This trend is exactly the opposite of the trend shown previously in FIG. 7 for increasing the sugar concentration.

2. Density of Fabricated Foams

The density of foams has been shown to greatly influence their mechanical properties, with higher density foams showing higher tensile and compressive strength and a larger Young's modulus. This should be fairly apparent, as a test sample of foam of the same volume as a solid sample will contain less material. However, not all foams are equivalent, and two foams with the same density but a different pore morphology (i.e. homogeneous vs. hierarchical) may have significantly different mechanical properties.

In this example, the density of the foam was simply determined by dividing the weight of a sample by its volume. The volume of the sample was determined by a water displacement technique. First, since the foam floats on top of water, the volume of an anchor needed to be determined. The sample was weighted down with an anchor in a graduated cylinder on top of a scale and the weight was tared. The foam is microporous and hydrophobic and, therefore, water cannot penetrate the foam under low pressure, so the graduated cylinder was filled with water to a predetermined volume graduation. The value of the volume graduation minus the volume of water gives the volume of the sample plus the weight. The formula to determine the volume of the sample from this process is as follows:

$$V_s = V_g - \frac{M_w}{\rho_w} - V_a \quad (3)$$

Where, $V_s$ is the volume of the sample, $V_g$ is the volume of the system as read on the graduated cylinder, $M_w$ is the mass of the water as read on the scale, $\rho_w$ is the density of water, and $V_a$ is the volume of the anchor used to keep the foam submerged. The density of the foam sample is simply:

$$\rho_s = \frac{M_s}{V_s} \quad (4)$$

Where, $\rho_s$ is the density of the foam, $M_s$ is the mass of the foam and $V_s$ is the foam volume.

a. Influence of Sugar Concentration on Foam Density

To determine the effect of sugar concentration on the density of the foam, a matrix of foam samples with varying sugar and isopropanol concentrations were made in cylindrical vials. These samples were made with sugar concentrations that varied from 2.06 g/mL to 5.15 g/mL in 1.03 g/mL increments and isopropanol concentrations that varied from 1.03 g/mL to 1.86 g/mL in 0.206 g/mL increments. The volume of PDMS was held constant at 4.85 mL. Of these 20 sample compositions, two were found to be unstable and phase separated. Both of these samples had isopropanol concentrations of 1.86 g/mL (the highest tested) and sugar concentrations of 2.06 g/mL and 3.09 g/mL (the lowest and second lowest tested). Thus, there are no densities reported for these two compositions.

Figure 9:
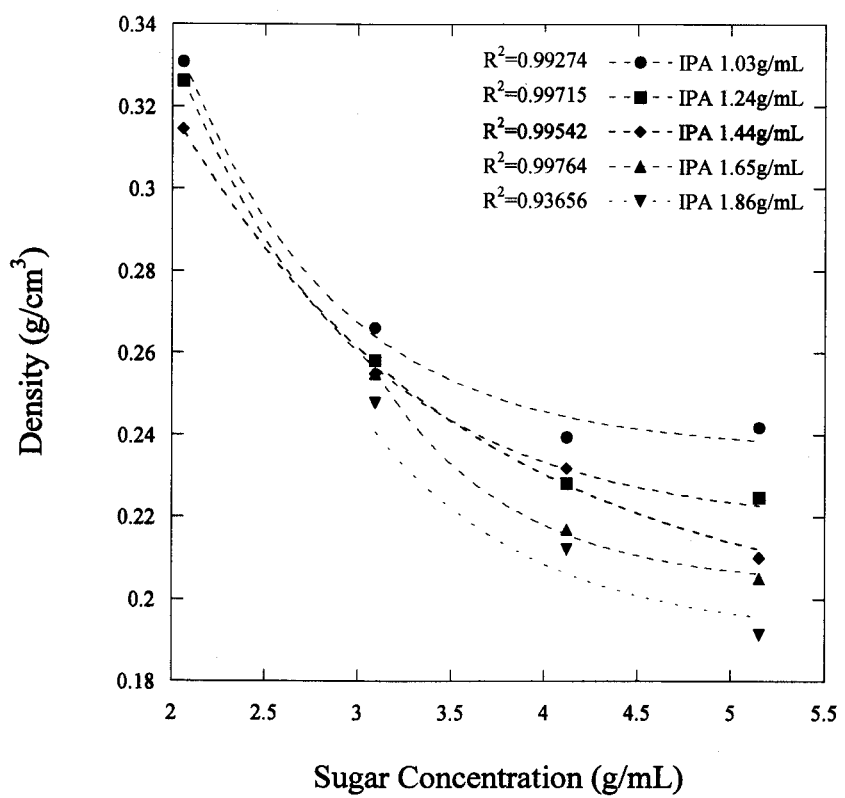
FIG. 9. A plot of the density of the foams as a function of the sugar concentration. The data is fitted to exponential decay functions with the displayed $R^2$ values.

Since the sugar is eventually dissolved out of the foam, one would expect that a higher initial sugar concentration would result in lower foam density. This is exactly what is observed; however, the higher concentration of sugar may also result in the composition retaining more isopropanol, leading to further expansion, and thus a lower foam density. Apparently, there is also a competing effect from the increase in viscosity of the suspension (as evidenced by increased difficulty when hand mixing) due to the increased concentration of sugar and therefore the density-sugar concentration plot is non-linear. FIG. 9 is a plot of the sugar concentration versus the density of each of the resulting foams for each of the compositions. As can be seen in FIG. 9, changing the isopropanol concentration in the suspo-emulsion has a greater impact on the density at higher sugar concentrations, showing that the density is an interdependent function of sugar and isopropanol. The grouping of the constant isopropanol curves at each interval is interesting to note because they tend to diverge as the amount of sugar is increased.

b. Influence of Isopropanol Concentration on Foam Density

Figure 10:
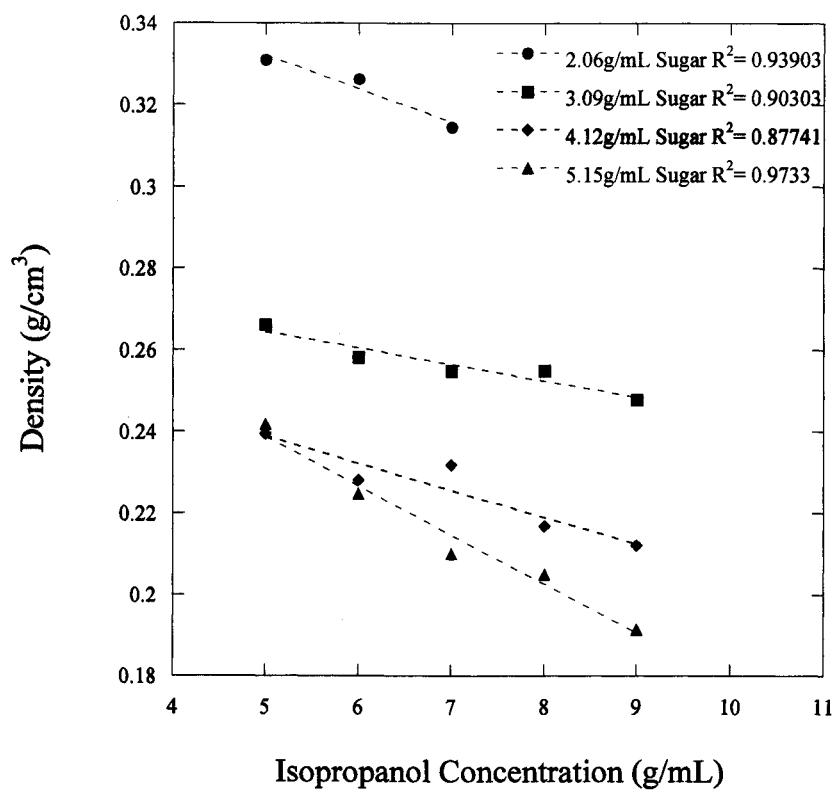
FIG. 10. A plot showing the effect of isopropanol concentration on foam density. The data is fitted to lines with the displayed $R^2$ values.

To determine the effect of the isopropanol concentration on the density of the foam the same matrix of samples from the previous section (a) was analyzed. Again, the isopropanol concentration was varied from 1.03 g/mL to 1.86 g/mL in 0.206 g/mL increments while the concentration of sugar was varied from 2.06 g/mL to 5.15 g/mL in 1.03 g/ml increments and the volume of PDMS was held constant at 4.85 mL. FIG. 10 is a plot of the density versus isopropanol concentration for each of the compositions tested. As the isopropanol concentration is increased, the density of the foam is decreased for a given sugar concentration. Larger bubbles in the suspo-emulsion result in larger pores in the cured foam and thus a lower overall density.

3. Porosity and Pore Size Distribution

The porosity of a foam is a measure of the void space in the foam, and for open cell foams such as those in this example, the porosity determines the maximum amount of fluid that can be held in the foam. The porosity is the opposite of the density, i.e., density is a measure of the amount of material per unit volume, whereas porosity is a measure of the amount of void space per unit volume. However, the porosity of the foam does not provide information on the size of the pores in the foam. A measurement of the pore size distribution is required to determine the size of the pores in the foam. The pore size distribution is important in determining the degree of hierarchy of the pores and is a standard method to quantify the morphology of a foam. Foams that display a hierarchical structure have been shown to have improved mechanical properties over heterogeneous foams without a hierarchical structure[19].

The porosity of the foam was determined from Equation 6:

$$P = 1 - \frac{\rho_s}{\rho_{PDMS}} \quad (5)$$

Where P is the porosity of the sample, $\rho_s$ is the measured density of the sample and $\rho_{PDMS}$ is the density of cured PDMS (~1.03 g/mL).

The pore size distribution was determined from the SEM micrographs. The micrographs were turned into binary black and white images using ImageJ, and then an algorithm to remove single pixel specks was used so that the Analyze Particles function was able to differentiate discrete pores. Then the Analyze Particles function that is built into Image J was used to determine the area of each pore and to count the number of pores within a given area range.

a. Influence of Sugar Concentration on Porosity and Pore Size Distribution

Figure 11:
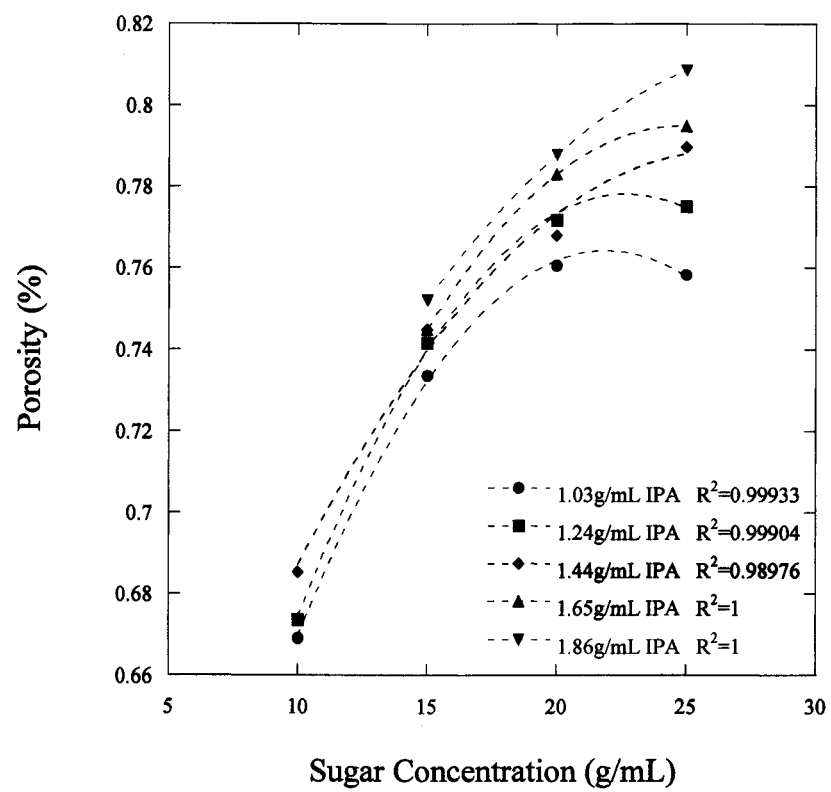
FIG. 11. A plot showing the influence of sugar concentration on the porosity (calculated from the density) of the produced foams. The data is fitted to quadratic curves with the displayed $R^2$ values.

The addition of sugar to the suspo-emulsion will result in a higher porosity simply because the sugar takes up some volume and then it is dissolved away toward the end of the production process. The addition of sugar to the suspo-emulsion will result in a higher porosity as long as the suspo-emulsion does not phase separate or phase invert. However, as shown in the phase diagram in FIG. 5, the addition of sugar generally results in reduced likelihood of phase separation until a critically high concentration of sugar either causes the foam to become weak and crumble (at low concentrations of isopropanol) or causes phase inversion (at high concentrations of isopropanol). A plot of the sugar concentration versus the porosity of the sample is shown in FIG. 11. This figure shows that the porosity of the sample is proportional to the sugar concentration, but the relationship is non-linear due to the influence of the isopropanol. At higher sugar concentrations, the isopropanol concentration creates greater variation.

Figure 12:
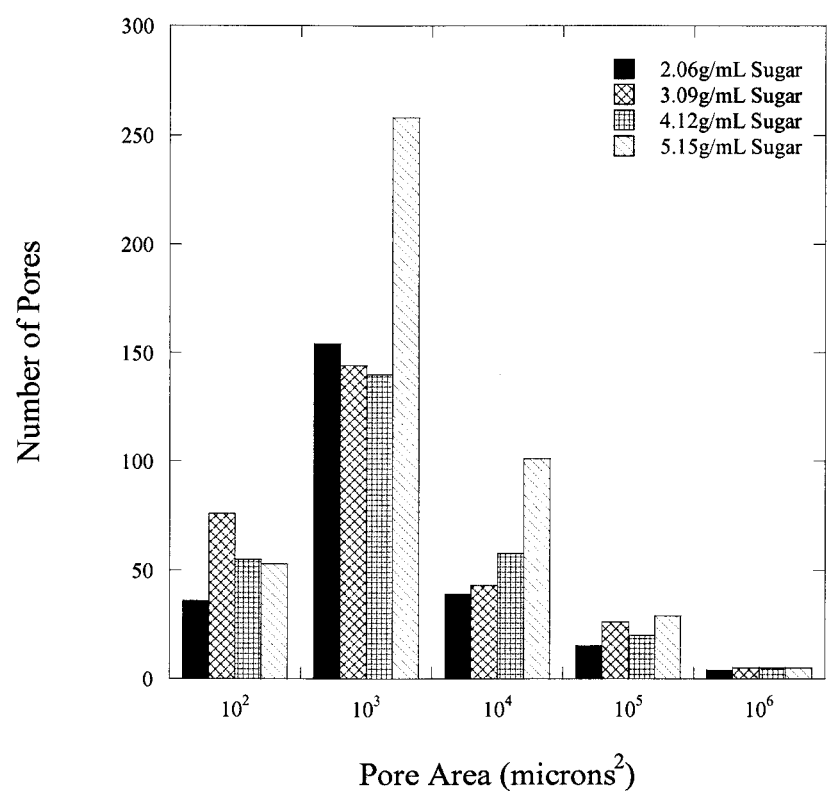
FIG. 12. A bar graph of pore size distribution generated from SEM micrographs for foam samples fabricated with a constant isopropanol concentration of 1.44 g/mL. There is a wide distribution of pore sizes and the highest sugar concentration has the greatest number of pores in each bin except for the $10^2$ bin.
Figure 13:
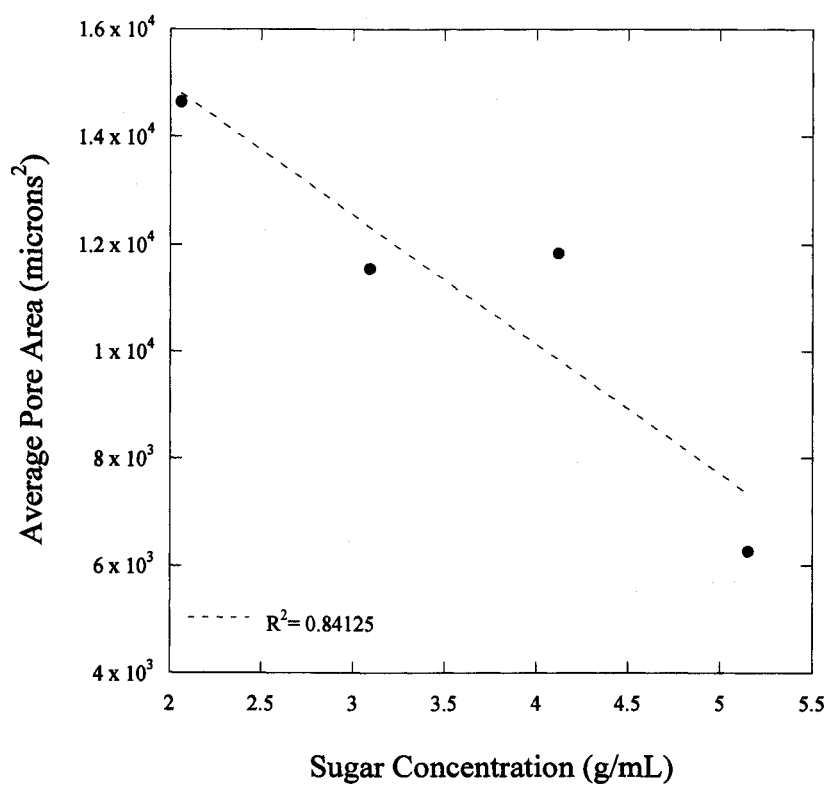
FIG. 13. Average pore area generated from SEM micrographs of foam samples fabricated with a constant isopropanol concentration of 1.44 g/mL and plotted against sugar concentration. The data is fitted to a line with an $R^2$ value of 0.84125.
Figure 14:
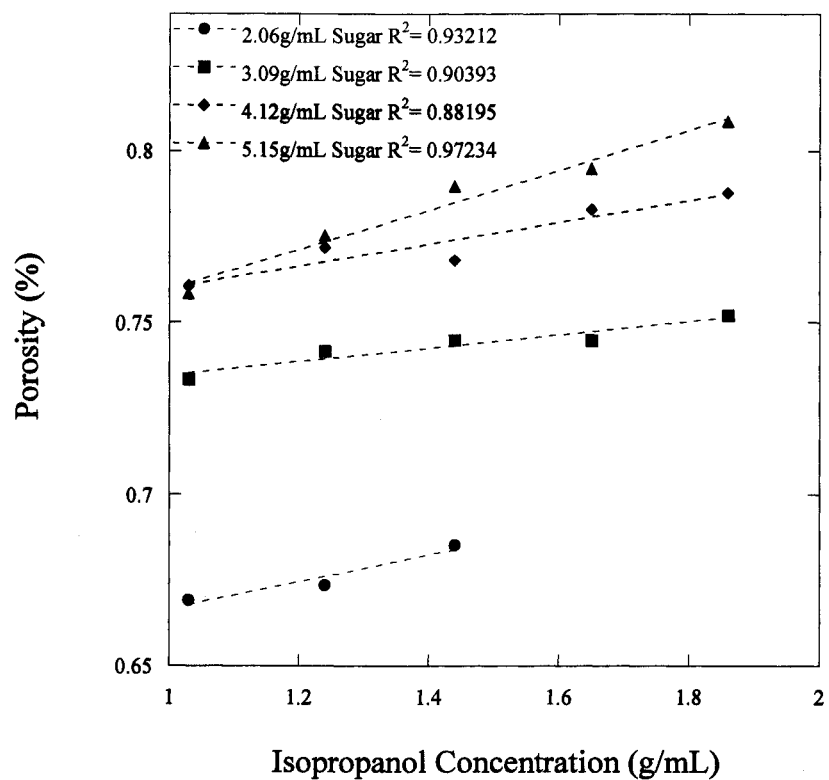
FIG. 14. Porosity of foam samples calculated from their densities. The data is fitted to lines with the displayed $R^2$ values.

The pore size distribution is also affected by the concentration of sugar in the sample because the smaller, highly interconnected pores appear to form from the dissolution of the sugar. FIG. 12 is a histogram of pore sizes of samples with a constant isopropanol concentration of 1.44 g/mL and variable sugar concentration from 2.06 g/mL to 5.15 g/mL in 1.03 g/mL increments. This histogram shows that there are more pores in the sample when the sugar concentration is increased. FIG. 13 is a plot of the sugar concentration in the suspo-emulsion versus average pore size. The average pore size is reduced as the sugar concentration in the suspo-emulsion is increased, showing that the pores are becoming smaller and more uniform in size since the pores generated by the dissolution of the sugar particles are smaller than the pores generated by the expansion of isopropanol.

b. Influence of Isopropanol Concentration on Porosity and Pore Size Distribution An increase in the isopropanol concentration will also result in an increased porosity, as shown in FIG. 14, which is a plot of the isopropanol concentration versus porosity. The more isopropanol added into the slurry, the more bubbles and pores are created. FIG. 14 shows a comparatively large increase in porosity between the samples prepared using sugar concentrations of 2.06 g/mL and 3.09 g/mL. There is, however, a limit to how much isopropanol can be added to the slurry, as an increase in isopropanol concentration results in an increased likelihood of phase separation as described previously in Example 1.b.

While the smaller and more highly interconnected pores appear to be from the sugar template, the larger pores are from the expansion of isopropanol. The pores from the sugar template are generally open-celled, but the throats (the connection between two pores) appear to be smaller.

Figure 15:
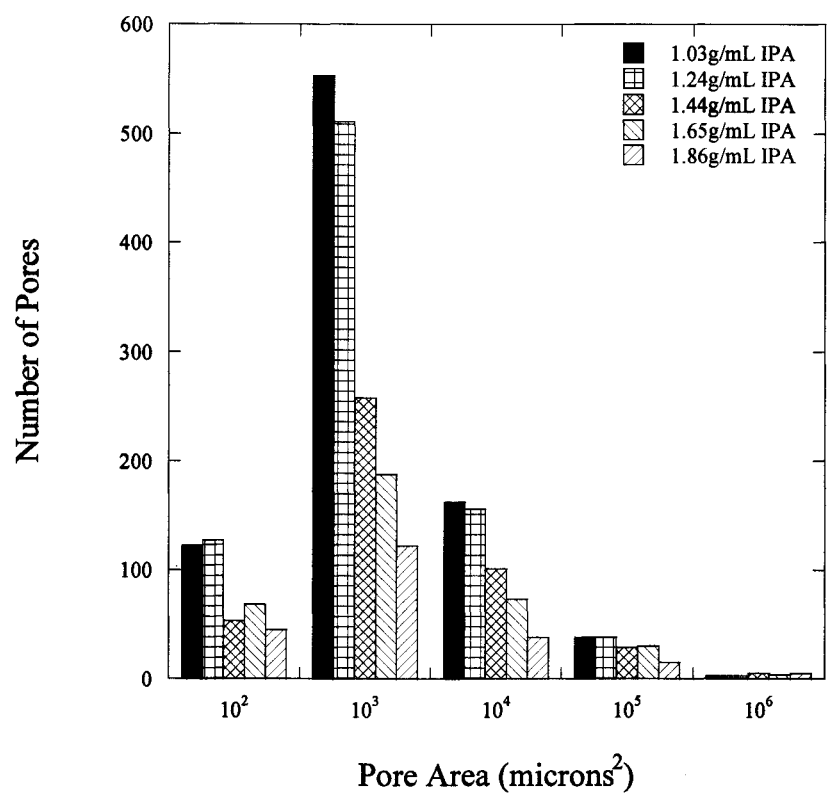
FIG. 15. A bar graph of pore size distribution generated from SEM micrographs of foam samples prepared with a constant sugar concentration of 5.15 g/mL. A lower isopropanol concentration will lead to more pores in the $10^3$ micron bin.
Figure 16:
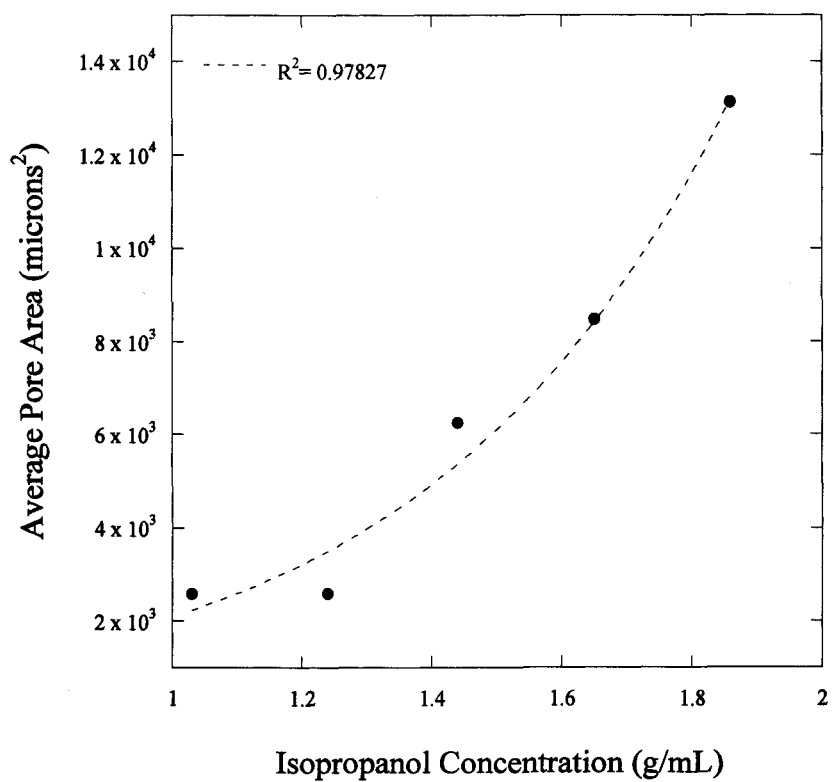
FIG. 16. Average pore area generated from SEM micrographs of foam samples fabricated with a constant sugar concentration of 5.15 g/mL and plotted against isopropanol concentration. The data is fitted to an exponential equation with an $R^2$ value of 0.97827.

FIG. 15 is a histogram of pore sizes of samples with constant sugar concentration of 5.15 g/mL and variable isopropanol concentration from 1.03 g/mL to 1.86 g/mL in 0.206 g/mL increments. This histogram shows that there are fewer pores in the sample when the isopropanol concentration is increased. FIG. 16 is a plot of the isopropanol concentration in the suspo-emulsion versus the average pore size. The average pore size increased as the concentration of isopropanol in the solution is increased indicating that the pores become larger and are more heterogeneous in size.

4. Ultimate Tensile Strength

Figure 17:
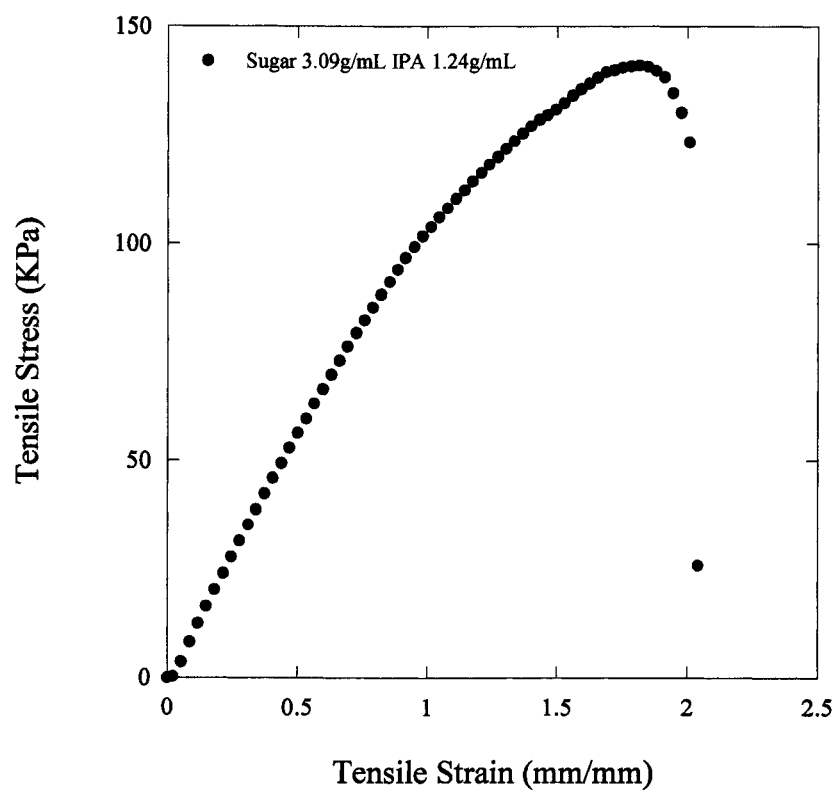
FIG. 17. A representative example of a graph of the raw data from Instron tensile testing. Foam samples were tested until failure. The UTS is the peak values of stress attained before sample failure.

The Ultimate Tensile Strength (UTS) of a material is a measure of the maximum tensile stress that a material can withstand before breaking. The value of the point with the largest tensile stress on a tensile stress-strain curve is the UTS and it is measured in units of force per unit area (Pascals). The UTS is an especially important parameter for foams because foams tend to tear easily compared to their bulk material counterparts. Experimentally, the procedure for measuring both the UTS and the Young's modulus follows the ASTM Standard D3574 for cellular materials. The foam samples are extended at a rate of 500 mm/min with measurements of the load and the extension taken every 50 microseconds. The samples are required to have a constant cross sectional area and are extended until they break. The suspo-emulsions are prepared in the same manner as in Example 1 and molded into cylinders with a diameter of approximately 0.75 inches. Each sample's diameter was measured to ensure that no errors arose from the assumption that the diameter of each sample was exactly the same, as the cross sectional area is used to calculate the Young's modulus. The samples were tested until failure on an Instron 4400 tensile test machine with a 250N load cell. The data collection program (Bluehill) was set up to take all the data necessary to calculate the UTS and Young's modulus. Three samples for each composition were tested and averaged. An example of a stress-strain diagram generated from the tests is shown in FIG. 17.

Figure 18:
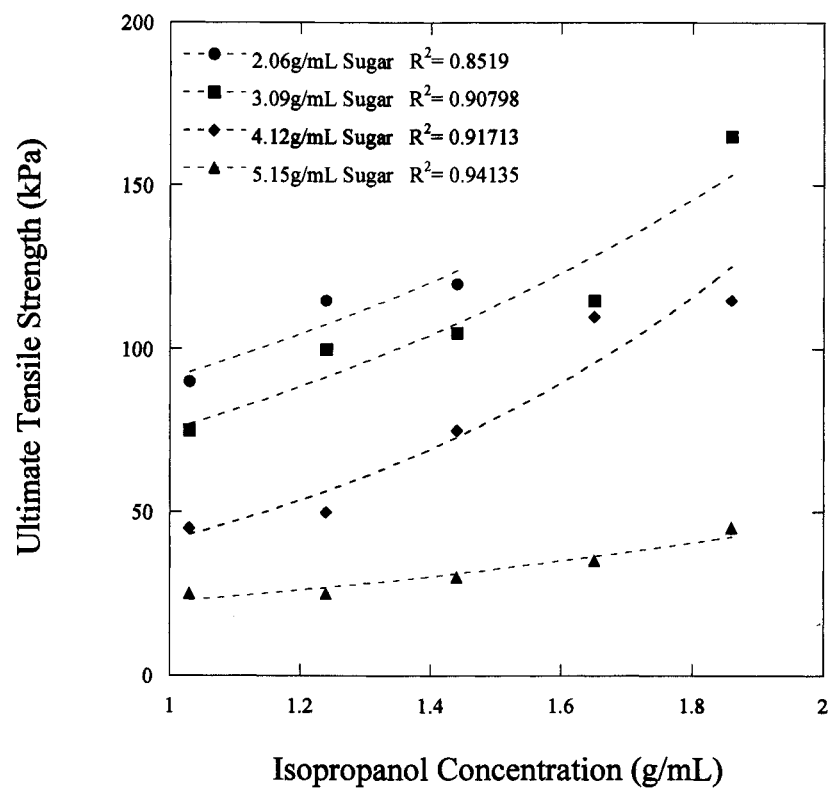
FIG. 18. A graph showing the average results of three Ultimate Tensile Strength (UTS) tests for each of the foam compositions. The UTS of bulk PDMS is 2.24 MPa. The data is fitted to exponential functions with the displayed $R^2$ values.

The results of the tests are shown in FIG. 18. In general, the UTS of the foam decreased with an increased sugar concentration. This is due to the decrease in density of the foam that results from overfilling with sugar. This is the usual trend for silicone foams, as a decrease in density normally results in a decrease in the UTS[16].

Conversely, an increase in the isopropanol concentration results in an increase in the UTS of the foam. This is attributed to the hierarchical structure that is formed from the interplay of the isopropanol pores and the pores formed by the dissolution of sugar.

Figure 19:
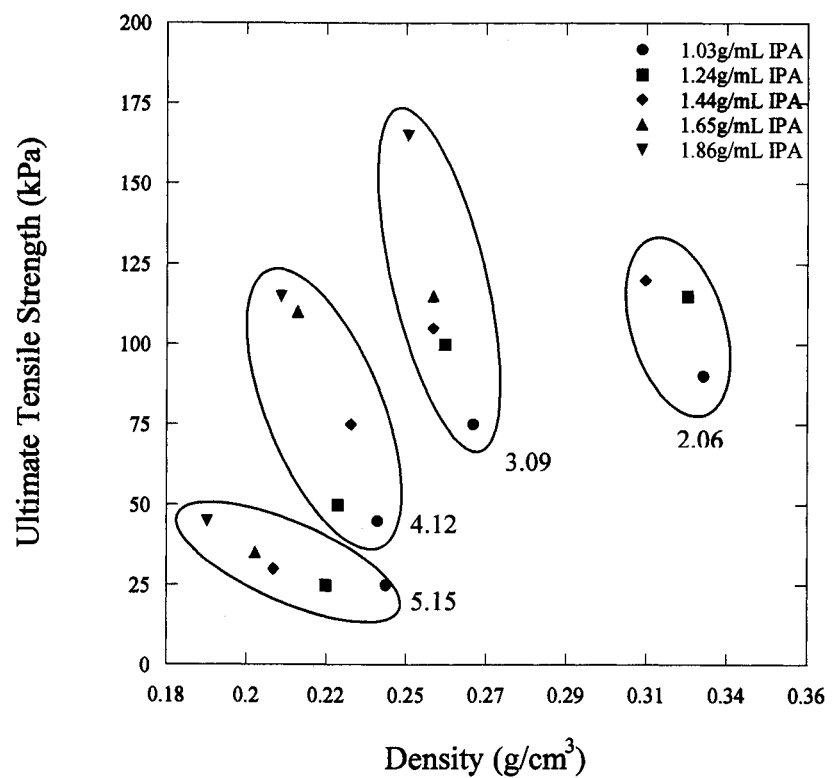
FIG. 19. A plot of UTS against foam density. Groups of samples with a constant sugar concentration (in g/mL) are circled.

The UTS is plotted against the density of the foam samples in FIG. 19. The trials with the same sugar concentration are grouped with ovals around them, and trials with the same isopropanol concentration are grouped by symbol. It is clear that as more isopropanol is added to the suspo-emulsion at a constant sugar concentration, the density of the resulting foam is decreased and UTS values are increased. Sugar appears to have an adverse effect on the UTS of the foam, but that is in part due to the reduction of density of the foam, which is known to decrease the strength of polymer foam[16].

5. Young's Modulus

The Young's modulus (or tensile modulus or modulus of elasticity) of a liner elastic material characterizes the stiffness of the material and is defined as the ratio of tensile stress over tensile strain. For the case of silicone foam, the Young's modulus is determined for small strains where the stress-strain curve is linear. The equation for the Young's modulus (E) is:

$$E = \frac{\sigma}{\varepsilon} \quad (6)$$

Where $\sigma$ is the tensile stress, and $\varepsilon$ is the tensile strain. The tensile stress is simply the force applied to the material divided by the cross sectional area of the material sample, as shown in Equation 7:

$$\sigma = \frac{F}{A_0} \quad (7)$$

Where F is the force applied to the sample, and $A_0$ is the initial cross sectional area of the sample. The tensile strain is the change in length of the material sample divided by the initial length of the material sample, as in Equation 8:

$$\varepsilon = \frac{\Delta L}{L_0} \quad (8)$$

Where $\Delta L$ is the change in length of material sample from its initial length to its final length, and $L_0$ is the initial length of the material sample.

Figure 20:
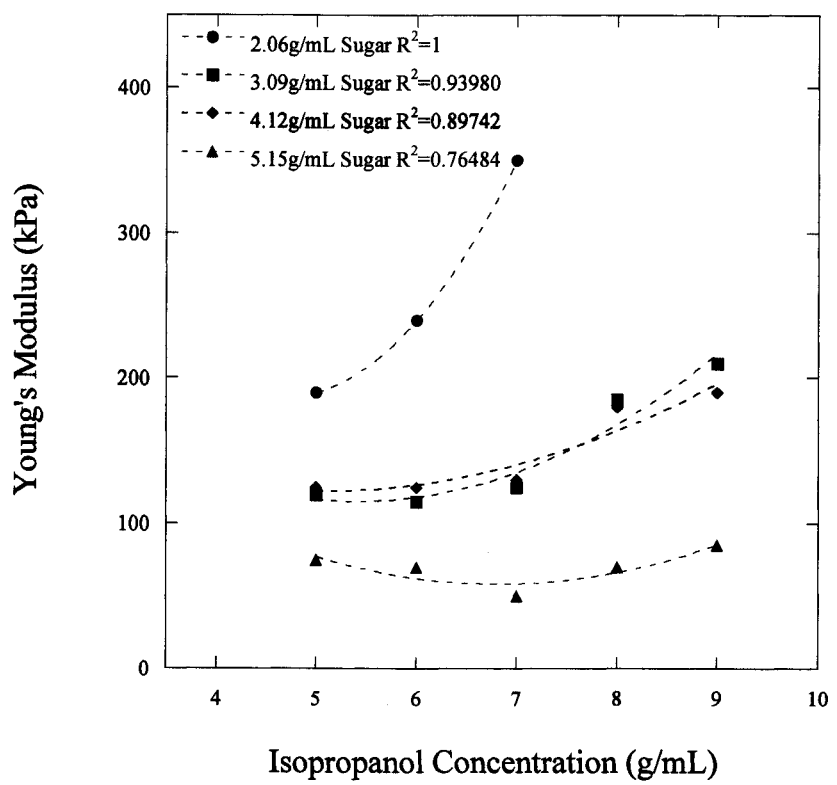
FIG. 20. A plot of Young's Modulus against isopropanol concentration, showing an average of the Young's Modulus of three samples for each composition. The Young's Modulus of bulk PDMS ranges from 360 KPa to 870 KPa. The data is fitted to quadratic equations with the displayed $R^2$ values.

FIG. 20 shows the isopropanol concentration versus the Young's modulus of the resulting foam. Interestingly, at a sugar concentration of 2.06 g/mL, increasing the isopropanol concentration drastically increases the Young's modulus of the foam. There also appears to be little difference between the moduli of foams that were made with increasing sugar concentrations of 3.09 g/mL and 4.12 g/mL, while foams made with a sugar concentration of 5.15 g/mL show a significant decrease in moduli values.

Figure 21:
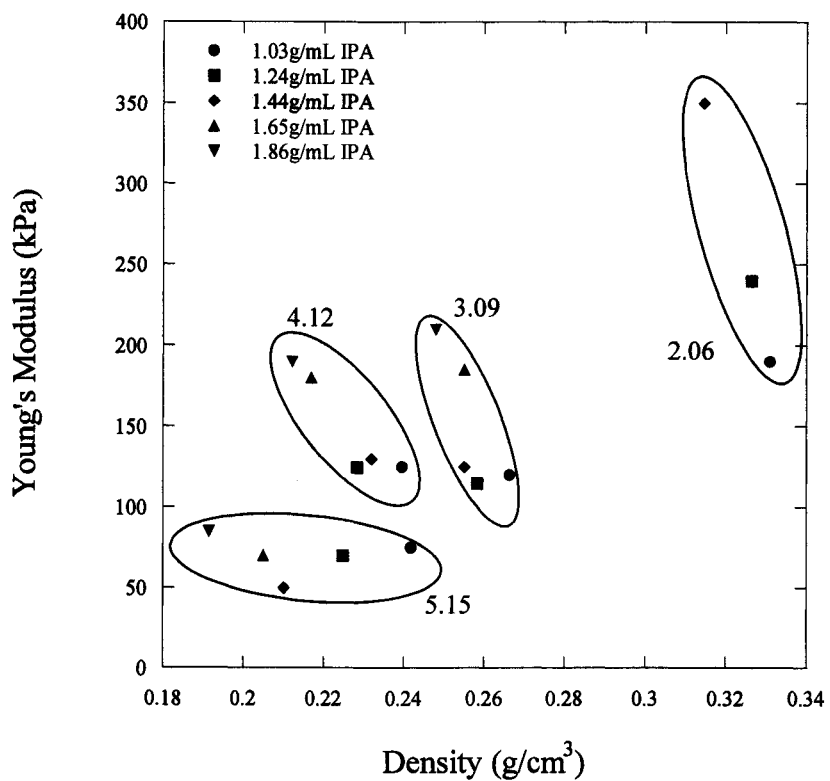
FIG. 21. A plot of Young's Modulus against foam density. Groups of samples with constant sugar concentrations (in g/mL) are circled.

FIG. 21 is a plot of the density versus the Young's modulus with the samples grouped by sugar content in ovals, and grouped by isopropanol content by symbol. From this graph it can be seen that an increase in sugar concentration reduces the density of the foam, but also significantly reduces the Young's modulus. It is also evident that, within each group, an increase in isopropanol concentration reduces the density and increases the Young's modulus. This pattern appears to hold true for all sugar concentrations. Therefore, to obtain the highest Young's modulus with the lowest density, would require the maximum possible isopropanol concentration, with the minimum possible sugar concentration, while avoiding the above-described phase separation and phase inversion.

EXAMPLE 3

Oil Absorption Test

The lower the density of an open-cell foam, the more oil it should be able to absorb due to the increased void space, however, some of the pores may be closed—leading to less oil absorption capacity. Thus, an oil absorption test where the mass of the sample is measured before and after being placed on a simulated oil slick was developed to allow for a more direct measurement of the performance of the different foam compositions. Cylindrical samples measuring 0.75 inches in diameter were placed atop a Petri dish that was filled with a commercial grade of motor oil having a density of 0.86 g/mL. The cross sectional area of each sample was held constant so that a before test mass and after test mass could be easily compared between the samples. Since PDMS is oleophilic, the motor oil was readily absorbed. After 1 minute the sample was removed and the mass was recorded again. As a performance measure, the weight gain of the foam was calculated using the following equation:

$$MG = \frac{M_f - M_i}{M_i} \quad (9)$$

Figure 22:
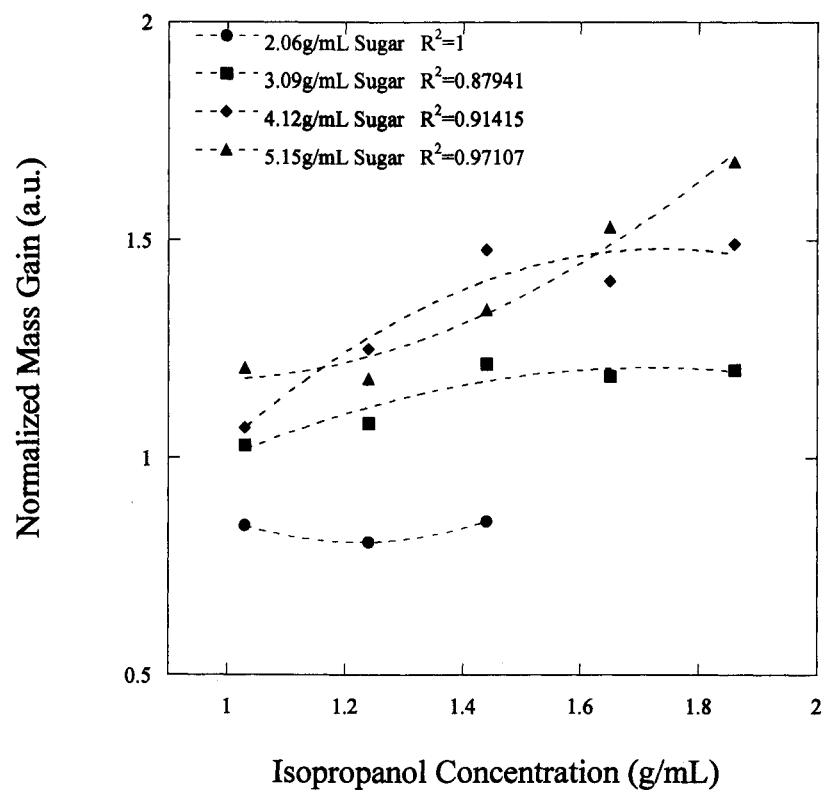
FIG. 22. Normalized mass gains for foam samples placed on top of oil slick for 1 minute plotted against isopropanol concentration. The data is fitted to quadratic equations with the displayed $R^2$ values.
Figure 23:
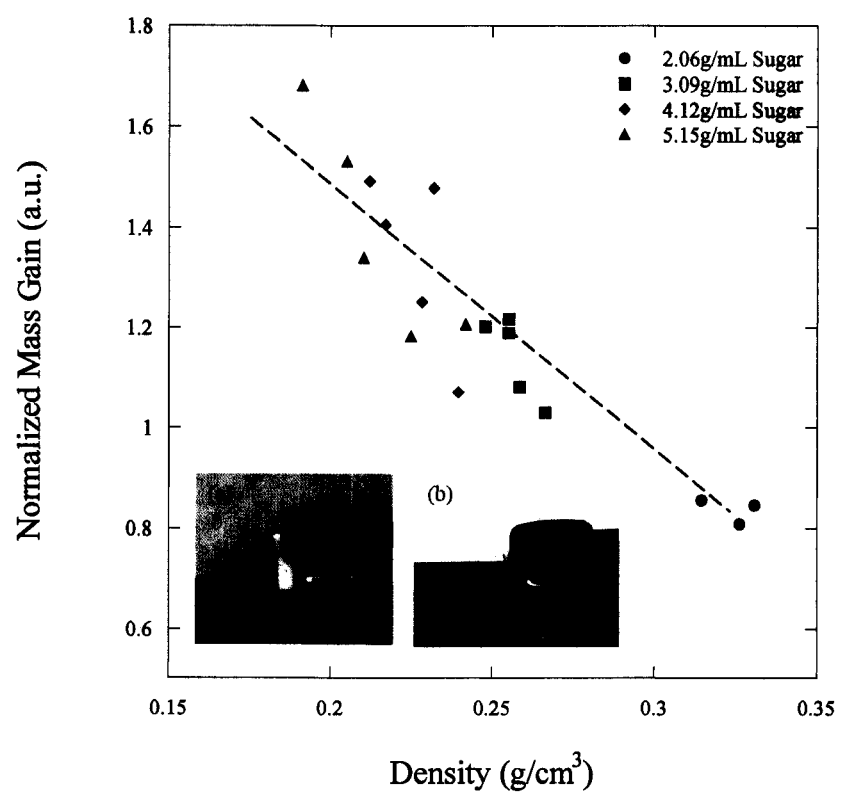
FIG. 23. Normalized mass gains for foam samples placed on top of oil slick for 1 minute plotted against the density. The normalized mass gains appear inversely proportional to the density of the foam samples. Inset (a) is a picture of the foam before absorbing oil (dyed red for visualization) and (b) is after absorbing oil. The dotted line is to guide the reader.
Figure 24:
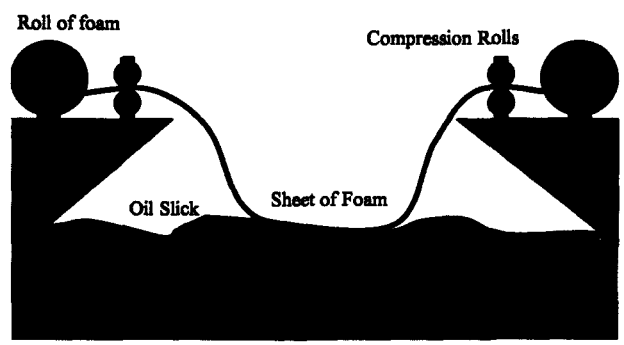
FIG. 24. Schematic of a field application of the open-cell polymer foam of the invention, in sheet form, passing between vessels by means of deck-mounted reels and absorbing oil from the water's surface en route.

Where, MG is the mass gain, $M_f$ is the final mass of the sample and $M_i$ is the initial mass of the sample. FIG. 22 is a plot of the normalized mass gain vs. isopropanol concentration in the suspo-emulsion for 1 minute. The test shows that an increase in isopropanol slightly increases the normalized mass gain of oil, and an increase in the sugar concentration more drastically increases the normalized mass gain. FIG. 23 is a plot of the density of the foam versus the normalized weight gain for 1 minute. These results verify that lower density foams show higher normalized weight gains. It is apparent from this testing that the sample made with the largest concentrations of isopropanol and sugar exhibited superior performance. Specifically, the sample made with 1.86 g/mL of isopropanol and 5.15 g/mL of sugar performed the best.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope of the appended claims.

Furthermore, the transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. The microporous open-cell foam, its process of preparation, the composition used in such process and the method of removing oil contamination from a body of water can, in alternate embodiments, be more specifically defined by any of the transitional terms "comprising", "consisting essentially of" and "consisting of".

All publications, patent and patent applications cited herein are incorporated by reference in their entirety.

REFERENCES

1. Jones, J. R., L. M. Ehrenfried, and L. L. Hench, Optimising bioactive glass scaffolds for bone tissue engineering. Biomaterials, 2006. 27(7): p. 964-973.
2. Darder, M., et al., Progress in Bionanocomposite and Bioinspired Foams. Advanced Materials, 2011. 23(44): p. 5262-5267.
3. Sepulveda, P., J. R. Jones, and L. L. Hench, Bioactive sol-gel foams for tissue repair. Journal of Biomedical Materials Research, 2002. 59(2): p. 340-348.
4. Yang, H. Q., et al., Synthesis and catalytic performances of hierarchical SAPO-34 monolith. Journal of Materials Chemistry, 2010. 20(16): p. 3227-3231.
5. Scheffler, F., et al., Zeolite covered polymer derived ceramic foams: novel hierarchical pore systems for sorption and catalysis. Advances in Applied Ceramics, 2005. 104(1): p. 43-48.
6. Barg, S., et al., Novel open cell aluminum foams and their use as reactive support for zeolite crystallization. Journal of Porous Materials, 2011. 18(1): p. 89-98.
7. Rainer, A., et al., Foaming of filled polyurethanes for fabrication of porous anode supports for intermediate temperature-solid oxide fuel cells. Journal of the American Ceramic Society, 2006. 89(6): p. 1795-1800.
8. Brun, N., et al., Design of Hierarchical Porous Carbonaceous Foams from a Dual-Template Approach and Their Use as Electrochemical Capacitor and Li Ion Battery Negative Electrodes. Journal of Physical Chemistry C, 2012. 116(1): p. 1408-1421.
9. Verdejo, R., et al., Enhanced acoustic damping in flexible polyurethane foams filled with carbon nanotubes. Composites Science and Technology, 2009. 69(10): p. 1564-1569.
10. Scarpa, F., L. G. Ciffo, and J. R. Yates, Dynamic properties of high structural integrity auxetic open cell foam. Smart Materials & Structures, 2004. 13(1): p. 49-56.
11. Kuhn, J., et al., Thermal Transport in Polystyrene and Polyurethan Foam Insulations. International Journal of Heat and Mass Transfer, 1992. 35(7): p. 1795-1801.
12. Hrubesh, L. W. and R. W. Pekala, Thermal Properties of Organic and Inorganic Aerogels. Journal of Materials Research, 1994. 9(3): p. 731-738.
13. Chen, J., H. Park, and K. Park, Synthesis of superporous hydrogels: Hydrogels with fast swelling and superabsorbent properties. Journal of Biomedical Materials Research, 1999. 44(1): p. 53-62.
14. Tondi, G., et al., Tannin-based rigid foams: A survey of chemical and physical properties. Bioresource Technology, 2009. 100(21): p. 5162-5169.
15. Cameron, N. R., High internal phase emulsion templating as a route to well-defined porous polymers. Polymer, 2005. 46(5): p. 1439-1449.
16. Eaves, D., Handbook of Polymer Foams. 2004.
17. Wong, L. L. C., et al., Macroporous Polymers with Hierarchical Pore Structure from Emulsion Templates Stabilised by Both Particles and Surfactants. Macromolecular Rapid Communications, 2011. 32(19): p. 1563-1568.
18. Tariq, F., et al., The influence of nanoscale microstructural variations on the pellet scale flow properties of hierarchical porous catalytic structures using multiscale 3D imaging. Chemical Engineering Science, 2011. 66(23): p. 5804-5812.
19. Wang, X. S. and R. Xia, Size-dependent effective modulus of hierarchical nanoporous foams. Epl, 2010. 92(1).
20. Wei, G. and P. X. Ma, Macroporous and nanofibrous polymer scaffolds and polymer/bone-like apatite composite scaffolds generated by sugar spheres. Journal of Biomedical Materials Research Part A, 2006. 78A(2): p. 306-315.
21. Vaquette, C., et al., An innovative method to obtain porous PLLA scaffolds with highly spherical and interconnected pores. Journal of Biomedical Materials Research Part B-Applied Biomaterials, 2008. 86B(1): p. 9-17.
22. Choi, S. J., et al., A Polydimethylsiloxane (PDMS) Sponge for the Selective Absorption of Oil from Water. Acs Applied Materials & Interfaces, 2011. 3(12): p. 4552-4556.
23. Hou, Q. P., D. W. Grijpma, and J. Feijen, Preparation of interconnected highly porous polymeric structures by a replication and freeze-drying process. Journal of Biomedical Materials Research Part B-Applied Biomaterials, 2003. 67B(2): p. 732-740.
24. Yang, Y. F., et al., Formation of porous PLGA scaffolds by a combining method of thermally induced phase separation and porogen leaching. Journal of Applied Polymer Science, 2008. 109(2): p. 1232-1241.
25. Narayan, D. and S. S. Venkatraman, Effect of pore size and interpore distance on endothelial cell growth on polymers. Journal of Biomedical Materials Research Part A, 2008. 87A(3): p. 710-718.
26. Misra, S. K., et al., Poly(3-hydroxybutyrate) multifunctional composite scaffolds for tissue engineering applications. Biomaterials, 2010. 31(10): p. 2806-2815.
27. Luckarift, H. R., et al., Facile Fabrication of Scalable, Hierarchically Structured Polymer/Carbon Architectures for Bioelectrodes. Acs Applied Materials & Interfaces, 2012. 4(4): p. 2082-2087.
28. Dorati, R., et al., Effect of porogen on the physico-chemical properties and degradation performance of PLGA scaffolds. Polymer Degradation and Stability, 2010. 95(4): p. 694-701.
29. Makaya, K., et al., Comparative study of silk fibroin porous scaffolds derived from salt/water and sucrose/hexafluoroisopropanol in cartilage formation. Journal of Bioscience and Bioengineering, 2009. 108(1): p. 68-75.
30. Huang, Y. C., et al., Fabrication and in vitro testing of polymeric delivery system for condensed DNA. Journal of Biomedical Materials Research Part A, 2003. 67A(4): p. 1384-1392.
31. Gong, X. H., et al., Fabrication of graded macroporous poly(lactic acid) scaffold by a progressive solvent casting/porogen leaching approach. Journal of Applied Polymer Science, 2012. 125(1): p. 571-577.
32. Tran, R. T., et al., A new generation of sodium chloride porogen for tissue engineering. Biotechnology and Applied Biochemistry, 2011. 58(5): p. 335-344.
33. Ghosh, S., et al., The double porogen approach as a new technique for the fabrication of interconnected poly(L-lactic acid) and starch based biodegradable scaffolds. Journal of Materials Science-Materials in Medicine, 2007. 18(2): p. 185-193.

34. Lin, H. R., et al., Preparation of macroporous biodegradable PLGA scaffolds for cell attachment with the use of mixed salts as porogen additives. Journal of Biomedical Materials Research, 2002. 63(3): p. 271-279.
35. Lin-Gibson, S., et al., Systematic investigation of porogen size and content on scaffold morphometric parameters and properties. Biomacromolecules, 2007. 8(5): p. 1511-1518.
36. Kim, T. G., H. J. Chung, and T. G. Park, Macroporous and nanofibrous hyaluronic acid/collagen hybrid scaffold fabricated by concurrent electrospinning and deposition/leaching of salt particles. Acta Biomaterialia, 2008. 4(6): p. 1611-1619.
37. Thomson, R. C., et al., Hydroxyapatite fiber reinforced poly(alpha-hydroxy ester) foams for bone regeneration. Biomaterials, 1998. 19(21): p. 1935-1943.
38. Murphy, W. L., et al., Salt fusion: An approach to improve pore interconnectivity within tissue engineering scaffolds. Tissue Engineering, 2002. 8(1): p. 43-52.
39. Cal, Q., et al., A novel porous cells scaffold made of polylactide-dextran blend by combining phase-separation and particle-leaching techniques. Biomaterials, 2002. 23(23): p. 4483-4492.
40. Lee, S. H., et al., Thermally produced biodegradable scaffolds for cartilage tissue engineering. Macromolecular Bioscience, 2004. 4(8): p. 802-810.
41. Kohnke, T., et al., Nanoreinforced xylan-cellulose composite foams by freeze-casting. Green Chemistry, 2012. 14(7): p. 1864-1869.
42. Mao, M., et al., Ice-template-induced silk fibroin-chitosan scaffolds with predefined microfluidic channels and fully porous structures. Acta Biomaterialia, 2012. 8(6): p. 2175-2184.
43. Li, J. S., et al., A one-step method to fabricate PLLA scaffolds with deposition of bioactive hydroxyapatite and collagen using ice-based microporogens. Acta Biomaterialia, 2010. 6(6): p. 2013-2019.
44. Martins, L., et al., Preparation of hierarchically structured porous aluminas by a dual soft template method. Microporous and Mesoporous Materials, 2010. 132(1-2): p. 268-275.
45. Texter, J., Templating hydrogels. Colloid and Polymer Science, 2009. 287(3): p. 313-321.
46. Binks, B. P., Particles as surfactants—similarities and differences. Current Opinion in Colloid & Interface Science, 2002. 7(1-2): p. 21-41.
47. Binks, B. P. and R. Murakami, Phase inversion of particle-stabilized materials from foams to dry water. Nature Materials, 2006. 5(11): p. 865-869.
48. Binks, B. P. and T. S. Horozov, Aqueous foams stabilized solely by silica nanoparticles. Angewandte Chemie-International Edition, 2005. 44(24): p. 3722-3725.
49. Joanna C. H. Wong, E. T., Stephan Busato, Urs T. Gonzenbach, Andre R. Studart, Paolo Ermanni and Ludwig J. Gaucklerb, Designing macroporous polymers from particle-stabilized foams. Journal of Materials Chemistry, 2010. 20(27).
50. Cohen, M. J., Economic Impact of an Environmental Accident—A Time-series Analysis of the Exxon Valdez Oil Spill in South-Central Alaska. Sociological Spectrum, 1993. 13(1): p. 35-63.
51. Dalton, T. and D. Jin, Extent and frequency of vessel oil spills in US marine protected areas. Marine Pollution Bulletin, 2010. 60(11): p. 1939-1945.
52. Balk, L., et al., Biomarkers in Natural Fish Populations Indicate Adverse Biological Effects of Offshore Oil Production. Plos One, 2011. 6(5).
53. Balseiro, A., et al., Pathological features in marine birds affected by the prestige's oil spill in the north of Spain. Journal of Wildlife Diseases, 2005. 41(2): p. 371-378.
54. Dean, T. A., et al., Food limitation and the recovery of sea otters following the 'Exxon Valdez' oil spill. Marine Ecology-Progress Series, 2002. 241: p. 255-270.
55. Ormseth, O. A. and M. Ben-David, Ingestion of crude oil: effects on digesta retention times and nutrient uptake in captive river otters. Journal of Comparative Physiology B-Biochemical Systemic and Environmental Physiology, 2000. 170(5-6): p. 419-428.
56. Garrott, R. A., L. L. Eberhardt, and D. M. Burn, Mortality of Sea Otters in Prince-William Sound Following the Exxon-Valdez Oil Spill. Marine Mammal Science, 1993. 9(4): p. 343-359.
57. Koyama, J. and A. Kakuno, Toxicity of heavy fuel oil, dispersant, and oil-dispersant mixtures to a marine fish, *Pagrus major*. Fisheries Science, 2004. 70(4): p. 587-594.
58. Ford, G. S., An investigation into the relationship of retail gas prices on oil company profitability. Applied Economics, 2011. 43(27): p. 4033-4041.
59. Liu, X. and K. W. Wirtz, The economy of oil spills: Direct and indirect costs as a function of spill size. Journal of Hazardous Materials, 2009. 171(1-3): p. 471-477.
60. BP Establishes $20 Billion Dollar Claims Fund For Deepwater Horizon Spill and Outlines Dividend Decisions. 2010 June.
61. Winning Teams Announced in the $1.4 Million Wendy Schmidt oil cleanup X Challenge. 2012.
62. Najar, A. M. and J. T. Turner, Enhanced oil recovery using the rotating-disc skimmer. Proceedings of the Institution of Mechanical Engineers Part E-Journal of Process Mechanical Engineering, 2000. 214(E4): p. 271-282.
63. Fountain, H., Advances in Oil Spill Cleanup Lag Since Valdez, in New York Times. 2010.
64. Petrucci, J., When to Use an Oil Skimmer. Power, 2010. 154(1): p. 17-18.
65. Nordvik, A. B., The Technology Windows of Opportunity for Marine Oil Spill Response as Related to Oil Weathering and Operations. Spill Science & Technology Bulletin, 1995. 2(1): p. 17-46.
66. Nordvik, A. B., et al., Oil and water separation in marine oil spill clean-up operations. Spill Science & Technology Bulletin, 1996. 3(3): p. 107-122.
67. Lee, K. and S. de Mora, In situ bioremediation strategies for oiled shoreline environments. Environmental Technology, 1999. 20(8): p. 783-794.
68. Berninger, J. P., E. S. Williams, and B. W. Brooks, An Initial Probabilistic Hazard Assessment of Oil Dispersants Approved by the United States National Contingency Plan. Environmental Toxicology and Chemistry, 2011. 30(7): p. 1704-1708.
69. Reynolds, J. G., P. R. Coronado, and L. W. Hrubesh, Hydrophobic aerogels for oil-spill cleanup—Intrinsic absorbing properties. Energy Sources, 2001. 23(9): p. 831-843.
70. Cai, J. C., Y; Luo, J; Sears, C. Utilizing Porous Materials for Oil Spill Cleanup. 2010.
71. Annunciado, T. R., T. H. D. Sydenstricker, and S. C. Amico, Experimental investigation of various vegetable fibers as sorbent materials for oil spills. Marine Pollution Bulletin, 2005. 50(11): p. 1340-1346.
72. S. J. Clarson, J. A. S., Siloxane Polymers. 1993, Englewood Cliffs, N.J.: Prentice-Hall.
73. Carn, F., et al., Three-dimensional opal-like silica foams. Langmuir, 2006. 22(12): p. 5469-5475.

74. Mao, X. J., S. W. Wang, and S. Z. Shimai, Porous ceramics with tri-modal pores prepared by foaming and starch consolidation. Ceramics International, 2008. 34(1): p. 107-112.
75. Suzuki, K., K. Ikari, and H. Imai, Synthesis of mesoporous silica foams with hierarchical trimodal pore structures. Journal of Materials Chemistry, 2003. 13(7): p. 1812-1816.
76. Gross, A. F. and A. P. Nowak, Hierarchical Carbon Foams with Independently Tunable Mesopore and Macropore Size Distributions. Langmuir, 2010. 26(13): p. 11378-11383.
77. Studart, A. R., et al., Hierarchical Porous Materials Made by Drying Complex Suspensions. Langmuir, 2011. 27(3): p. 955-964.
78. Juillerat, F. K., et al., Self-setting particle-stabilized foams with hierarchical pore structures. Materials Letters, 2010. 64(13): p. 1468-1470.
79. Vakifahmetoglu, C., et al., SiOC Ceramic Monoliths with Hierarchical Porosity. International Journal of Applied Ceramic Technology, 2010. 7(4): p. 528-535.
80. Huerta, L., et al., Nanosized mesoporous silica coatings on ceramic foams: New hierarchical rigid monoliths. Chemistry of Materials, 2007. 19(5): p. 1082-1088.
81. Alauzun, J. G., et al., Novel monolith-type boron nitride hierarchical foams obtained through integrative chemistry. Journal of Materials Chemistry, 2011. 21(36): p. 14025-14030.
82. Zhang, H., et al., Preparation of TiO2, CeO2, and ZrO2 hierarchical structures in "one-pot" reactions. Journal of Colloid and Interface Science, 2009. 333(2): p. 764-770.

What is claimed is:

1. A process of making a polymeric microporous, open-cell foam of hierarchical structure said method comprising:
    (a) preparing a first mixture of a volatile liquid blowing agent and a soluble, solid viscosity modifier;
    (b) admixing said first mixture with a foamable liquid polymer to which a curing agent for said polymer has been added either before or after the admixture of said first mixture with said polymer, thereby forming a second mixture;
    (c) heating said second mixture at a temperature in the range of from about 50° C. to about 95° C. to produce a cured, compressible cellular foam; and
    (d) treating said cured foam with a solvent effective to remove from said foam structure said solid viscosity modifier and form intercellular passages in said foam.

2. The process of claim 1 wherein said first mixture is prepared by combining isopropanol with sugar, said second mixture is formed by admixing said first mixture with a liquid polymer comprising polydimethylsiloxane and a curing agent for said polydimethylsiloxane; said cured, compressible cellular foam is produced by heating said second mixture to a temperature between about 75° C. and about 85° C.; and said cured, compressible cellular foam is treated by washing with water to remove sugar from the cells of said foam.

3. The process of claim 2, wherein said cured, compressible foam is simultaneously subjected to compressive force during said washing.

4. The process of claim 1, wherein said foamable liquid polymer is selected from the group consisting of a silicone elastomer and a polyepoxide.

5. The process of claim 1, wherein said foamable liquid polymer comprises a polyorganosiloxane.

6. The process of claim 1, wherein said blowing agent is selected from the group consisting of aliphatic alcohols having 1-4 carbon atoms, aliphatic hydrocarbons having 4-9 carbon atoms and fully and partially halogenated aliphatic hydrocarbons having 2-4 carbon atoms.

7. The process of claim 1, wherein said soluble, solid viscosity modifier is selected from the group consisting of a water soluble carbohydrate, sodium chloride and sodium bicarbonate ($NaHCO_3$).

8. The process of claim 1, wherein said foamable liquid polymer is polydimethylsiloxane, said blowing agent is isopropanol and said solid viscosity modifier is sugar.

9. The process of claim 2, wherein the sugar concentration in the second mixture is in the range from about 1 g/mL to about 8.5 g/mL and the isopropanol concentration in the second mixture is in the range from about 0.5 to about 3.0 g/mL, said concentrations based on the volume of polydimethylsiloxane.

10. The process of claim 9, wherein the curing temperature is held constant at about 80° C.

11. A polymeric microporous, open-cell foam of hierarchical structure prepared by the process of claim 1.

12. The polymeric microporous, open-cell foam of claim 11, wherein the open cell foam is effective to reversibly absorb oil.

* * * * *